US008781963B1

(12) United States Patent
Feng et al.

(10) Patent No.: US 8,781,963 B1
(45) Date of Patent: Jul. 15, 2014

(54) SYSTEMS AND METHODS FOR PROVIDING A MOBILE FINANCIAL PLATFORM

(75) Inventors: Shuying Feng, Garnet Valley, PA (US); Anil Jacob, Woolwich Township, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 12/945,301

(22) Filed: Nov. 12, 2010
 (Under 37 CFR 1.47)

Related U.S. Application Data

(60) Provisional application No. 61/324,999, filed on Apr. 16, 2010.

(51) Int. Cl.
 *G06Q 40/00* (2012.01)
 *G06Q 40/02* (2012.01)
 *G06Q 20/10* (2012.01)
 *G07F 19/00* (2006.01)

(52) U.S. Cl.
 CPC ............... *G06Q 40/02* (2013.01); *G06Q 40/00* (2013.01); *G07F 19/00* (2013.01); *G06Q 20/108* (2013.01)
 USPC .......................................................... 705/42

(58) Field of Classification Search
 CPC .............................. G06Q 20/108; G06Q 40/00
 USPC ............................................................ 705/42
 See application file for complete search history.

(56) References Cited

U.S. PATENT DOCUMENTS

| | | | |
|---|---|---|---|
| 5,895,454 | A | 4/1999 | Harrington |
| 7,200,566 | B1 | 4/2007 | Moore et al. |
| 7,546,254 | B2 | 6/2009 | Bednarek |
| 7,555,444 | B1 | 6/2009 | Wilson et al. |
| 7,627,310 | B2 | 12/2009 | Starr et al. |
| 7,657,489 | B2 | 2/2010 | Stambaugh |
| 7,693,752 | B2 | 4/2010 | Jaramillo |
| 7,708,202 | B2 | 5/2010 | Hawkins |
| 7,774,231 | B2 | 8/2010 | Pond et al. |

(Continued)

FOREIGN PATENT DOCUMENTS

| | | | | |
|---|---|---|---|---|
| WO | WO 02/13120 | | 2/2002 | |
| WO | WO 02/13120 A1 | * | 2/2002 | .............. G06F 17/60 |

OTHER PUBLICATIONS

Q&A Consumer Action Publication, Chase Bank, 2009.*
Q&A Consumer Action Publication, Chase Bank, 20009.*

(Continued)

*Primary Examiner* — Ig T An
*Assistant Examiner* — Michael Maicher
(74) *Attorney, Agent, or Firm* — Hunton & Williams LLP

(57) ABSTRACT

The invention provides systems and methods that provide a mobile banking platform to a user. The system may be in the form of an application disposed in a mobile customer machine, the application tangibly disposed in the form of code on a computer readable medium. The application may comprise a processing portion that interfaces with a human user and interfaces with a bank processing system, the processing portion providing financial related functionality relating to a financial account of the user, the processing portion: (1) inputting data related to the financial account from at least one of the user and from the bank processing system; (2) inputting a command related to the data; (3) performing processing on the data in response to the command; and (4) outputting a result based on the processing performed, the result output to at least one of the user and the bank processing system.

23 Claims, 20 Drawing Sheets

(56) References Cited

U.S. PATENT DOCUMENTS

| | | | |
|---|---|---|---|
| 7,813,955 | B2 | 10/2010 | Ariff et al. |
| 7,822,688 | B2 | 10/2010 | Labrou et al. |
| 7,856,377 | B2 | 12/2010 | Cohagan et al. |
| 7,886,964 | B2 | 2/2011 | Steinecker |
| 7,899,706 | B1 | 3/2011 | Stone et al. |
| 7,908,170 | B2 | 3/2011 | Asmar et al. |
| 7,945,479 | B2 | 5/2011 | Asher et al. |
| 7,974,889 | B2 | 7/2011 | Raimbeault |
| 7,992,781 | B2 | 8/2011 | Hammad |
| 7,996,252 | B2 | 8/2011 | Shahrabi et al. |
| 8,000,749 | B1 | 8/2011 | McConnell et al. |
| 8,014,755 | B2 | 9/2011 | Sun et al. |
| 8,019,365 | B2 | 9/2011 | Fisher |
| 8,024,220 | B2 | 9/2011 | Ariff et al. |
| 8,027,891 | B2 | 9/2011 | Preston et al. |
| 2001/0056402 | A1* | 12/2001 | Ahuja et al. ............... 705/43 |
| 2005/0097046 | A1* | 5/2005 | Singfield ................... 705/42 |
| 2007/0011089 | A1 | 1/2007 | DeSchryver |
| 2007/0295803 | A1 | 12/2007 | Levine et al. |
| 2008/0162338 | A1* | 7/2008 | Samuels et al. ............ 705/38 |
| 2008/0177659 | A1 | 7/2008 | Lacey et al. |
| 2008/0275779 | A1* | 11/2008 | Lakshminarayanan ......... 705/14 |
| 2009/0132813 | A1* | 5/2009 | Schibuk .................... 713/158 |
| 2009/0265245 | A1 | 10/2009 | Wright |
| 2009/0287603 | A1* | 11/2009 | Lamar et al. ............... 705/40 |
| 2010/0106569 | A1 | 4/2010 | Grimes |
| 2010/0106598 | A1 | 4/2010 | Grimes |
| 2010/0299212 | A1 | 11/2010 | Graylin et al. |
| 2011/0082772 | A1 | 4/2011 | Hirson |
| 2011/0087595 | A1 | 4/2011 | Sabella |
| 2011/0106635 | A1 | 5/2011 | Khan et al. |
| 2011/0112866 | A1 | 5/2011 | Gerrans |
| 2011/0112898 | A1 | 5/2011 | White |
| 2011/0153403 | A1 | 6/2011 | Postre |
| 2011/0208589 | A1 | 8/2011 | Garg |
| 2011/0238471 | A1 | 9/2011 | Trzcinski |

OTHER PUBLICATIONS

Malykhina, Elena; "Cell Phone Software Formats Checks for Online Banking;" InformationWeek; Jan. 24, 2008.

* cited by examiner

List of Credit Card Alerts

Notify Me When

A. A balance transfer has been posted to this account

B. An international charge has been posted to this account

C. A payment has been posted to this account

D. More than ($ USD) [____] is charged to my card for a single transaction

E. My available credit is less than ($ USD) [____]

F. My available credit is less than [____] % of the credit limit

G. My balance reaches ($ USD) [____]
(Your balance will be included in the alert message)

H. My payment is due in [3] days

I. My rewards balance exceeds [____] Cash

J. No payment was received for this account

Potential bundles:
Balance alerts (A, B, D, E, F, G)
Payment alerts (C, H, J)

Fig. 16

Further VRU Items

| | Menu Option | Comments |
|---|---|---|
| 2 | Payment mailing address | Add link to card payment page |
| 3 | Verify a credit | |
| 3 | Next statement date | |
| 3 | Request a copy of recent billing stmt | Curr offers last 3 mos |
| 4 | Request a PIN for card access<br>• Enter last 4 digit of ss#<br>• Enter curr PIN before new one or send PIN in mail | |

Fig. 18

//SYSTEMS AND METHODS FOR PROVIDING A MOBILE FINANCIAL PLATFORM

RELATED APPLICATION

This application claims priority to U.S. Provisional Patent Application 61/324,999 filed Apr. 16, 2010, the content of which is incorporated herein by reference in its entirety.

BACKGROUND OF THE INVENTION

Presently, cellular phones (cell phones) are used extensively by a wide variety of users. Cell phones provide a highly useful form of mobile communication, and provide a wide variety of related functionality. However, known systems and methods fail to fully leverage cell phone technology, and other personal digital assistant (PDA) technology, to provide financial related processing.

The systems and methods of embodiments of the invention address this and other shortcomings of known technology.

BRIEF SUMMARY OF THE INVENTION

The invention provides systems and methods that provide a mobile banking platform to a user, i.e., a customer. The system may be in the form of an application disposed in a mobile customer machine, the application tangibly disposed in the form of code on a computer readable medium. The application may comprise a processing portion that interfaces with a human user and interfaces with a bank processing system, the processing portion providing financial related functionality relating to a financial account of the user, the processing portion: (1) inputting data related to the financial account from at least one of the user and from the bank processing system; (2) inputting a command related to the data; (3) performing processing on the data in response to the command; and (4) outputting a result based on the processing performed, the result output to at least one of the user and the bank processing system.

BRIEF DESCRIPTION OF THE DRAWINGS

The present invention can be more fully understood by reading the following detailed description together with the accompanying drawings, in which like reference indicators are used to designate like elements, and in which:

FIG. 16 is a diagram showing an interface 1602 that illustrates a listing of credit card alerts in accordance with one embodiment of the invention.

FIG. 18 is a diagram showing further VRU items in accordance with one embodiment of the invention.

DETAILED DESCRIPTION OF THE INVENTION

Figure 1:
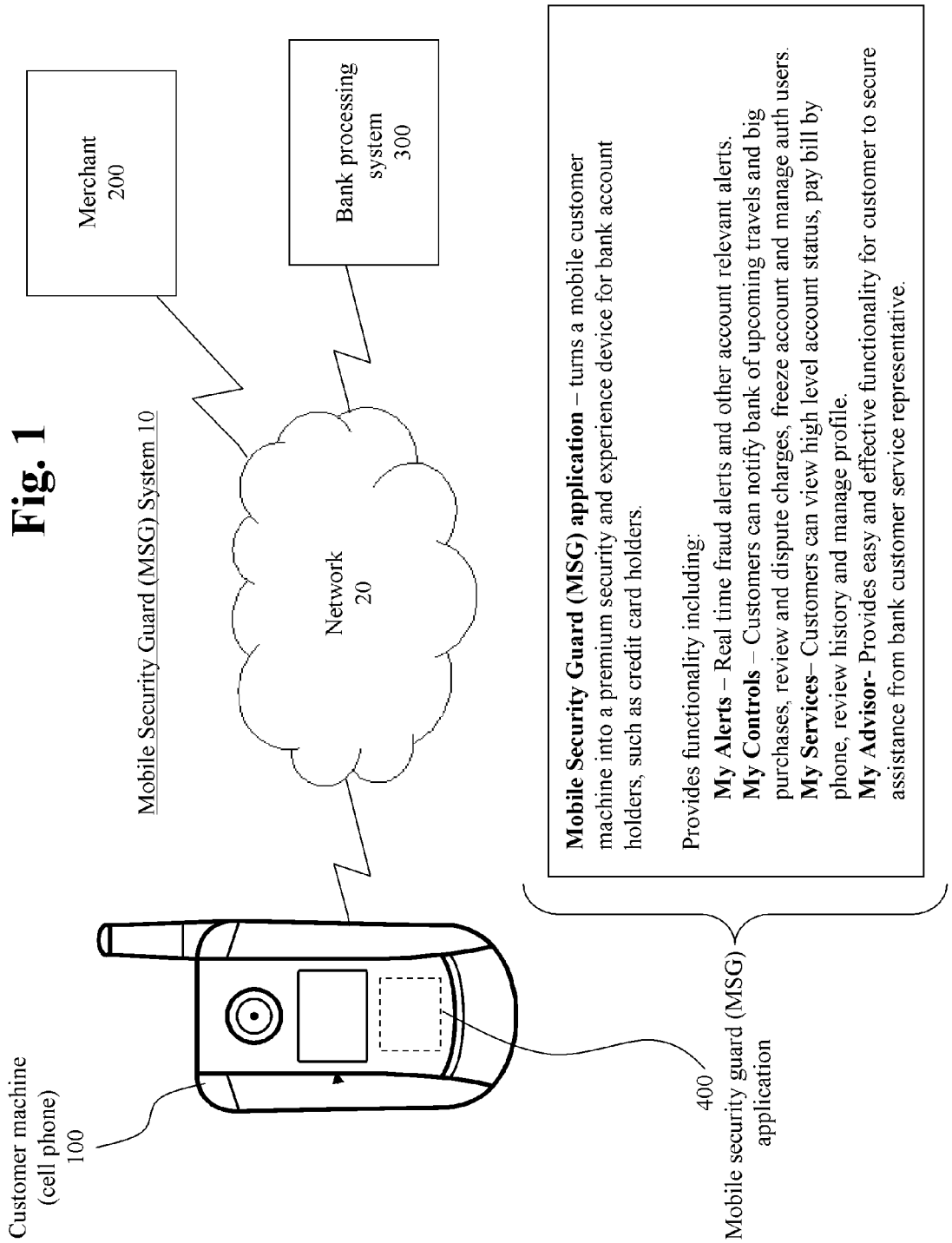
FIG. 1 is a block diagram showing a mobile security guard (MSG) system, in accordance with one embodiment of the invention.

Hereinafter, aspects of the Mobile Security Guard (MSG) system in accordance with various embodiments of the invention will be described. As used herein, any term in the singular may be interpreted to be in the plural, and alternatively, any term in the plural may be interpreted to be in the singular.

As used herein, the terms "information" and "data" are used interchangeably.

As used herein, customer machine, customer device, customer mobile device and similar terms have been used interchangeably.

Various description is provided herein referring to "Chase" bank. However, it is of course appreciated that the systems and methods of the invention are not limited to any such particular entity.

The inventive system is characterized herein as the "Mobile Security Guard" System (the "MSG System"). The MSG System converts a mobile phone, for example, into the ultimate security and premium experience device for a customer of bank services, and in particular a cardholder, such as a credit card holder.

The MSG System leverages the combination of customer, i.e., user, initiated notifications and confirmations with alerts and background monitoring by a bank platform maintained by a bank. The customer may vary parameters driving the alerts and background monitoring. This combination of features is presented in conjunction with providing a rich, visual and tactile interface for the customer to interact with bank customer service.

In one arrangement, a Mobile Security Guard (MSG) System includes a bank processing system and an MSG processing portion. The MSG processing portion may be disposed in a cell phone so as to provide enhanced functionality to a user of the cell phone as described above. Alternatively, the MSG processing portion may be disposed separate from the cell phone and interface with the cell phone using standard cell phone technology (or interface using some other communication channel). The MSG processing portion may be used in conjunction with other mobile devices distinct from a "cell phone," such as a PDA (personal digital assistant), for example. The bank processing system, the MSG processing portion, and the cell phone may communicate over a cellular network. Alternately, communication may be provided in some other manner. A wide variety of features are provided by the MSG System.

The MSG System provides key objectives including:
(1) Deliver a superior, relevant customer service experience that drives a shift to self serve through digital interactions;
(2) Turn customer moments of pain to loyalty and trust building opportunities by improving the experience before, at and after a Point of Sale (POS);
(3) Provide visible evidence of fraud at work; and
(4) Various other features leveraging the known cell phone platform.

The MSG System provides at least four core processing functions, in accordance with embodiments of the invention. These include My Alerts, My Controls, My Services, and My Advisor, as characterized herein and described below.

My Alerts provide real time fraud alerts as well as a variety of other alerts. A customer can select from a bundle of alert options that are available to them. Authorization for a transaction may be held till authorized by the customer or timed out, for example. The customer may vary the parameters triggering an alert, e.g. such as specifying a geographical area that a transaction may be performed in—without triggering an alert.

My Controls provides functionality such that customers can notify the bank of upcoming travels or big purchases, review and dispute charges, freeze their account, and manage authorized users, for example.

My Services provides functionality such that customers can view high level account status, pay a bill using their cell phone, review MSG System history, and manage profile associated with their accounts, for example.

My Advisor provides functionality such that a customer can opt for an "always on" choice that enables enhanced communications with support systems and persons. For example, My Advisor allows a customers to call the particular bank with the push of a button; allows customers to bypass some security prompts at the beginning of a call to the bank or other entity; and allows a customer service person to see a screen which is (or was) displayed to the customer.

FIG. 1 is a block diagram showing a mobile security guard (MSG) system 10, in accordance with one embodiment of the invention. In the arrangement as shown in FIG. 1, the MSG system 10 includes a customer machine 100, a merchant 200, and a bank processing system 300. The customer machine 100 may be a cellular phone, i.e., a cell phone.

The MSG system further includes an MSG application 400. The MSG application 400 may be disposed in the customer machine 100 so as to provide enhanced functionality to the user of the cell phone 100, as described herein. Alternatively, the MSG application 400 may be disposed separate from the cell phone and interface with the cell phone using standard cell phone technology (or interface using some other communication channel). In accordance with one embodiment of the invention, the disposition of the MSG application 400 (in the customer machine 100 or outside the customer machine 100) may be essentially transparent to the customer, i.e., assuming, in the later case, that the communication channel being used is operational. Various features of the invention are described herein as used in conjunction with a cell phone. However, any of the features described herein relating to operation of the MSG application 400 and/or the MSG bank processing portion 314 may also be used in conjunction with other mobile devices distinct from a "cell phone," such as a PDA (personal digital assistant), a smart, phone, TABLET PC, laptop computer, NETBOOK, ITOUCH, WAD, IPHONE, XBOX, intelligent plastic (i.e., a credit card having processing and connectivity capabilities), any other mobile computer, as well as various other devices, for example. The customer machine 100, the merchant 200, the bank processing system 300, and the MSG application 400 may communicate over a network 20, i.e., such as a cellular network. Alternately, communication may be provided in some other manner. Various features are provided by the MSG System 10 as described herein.

Figure 2:
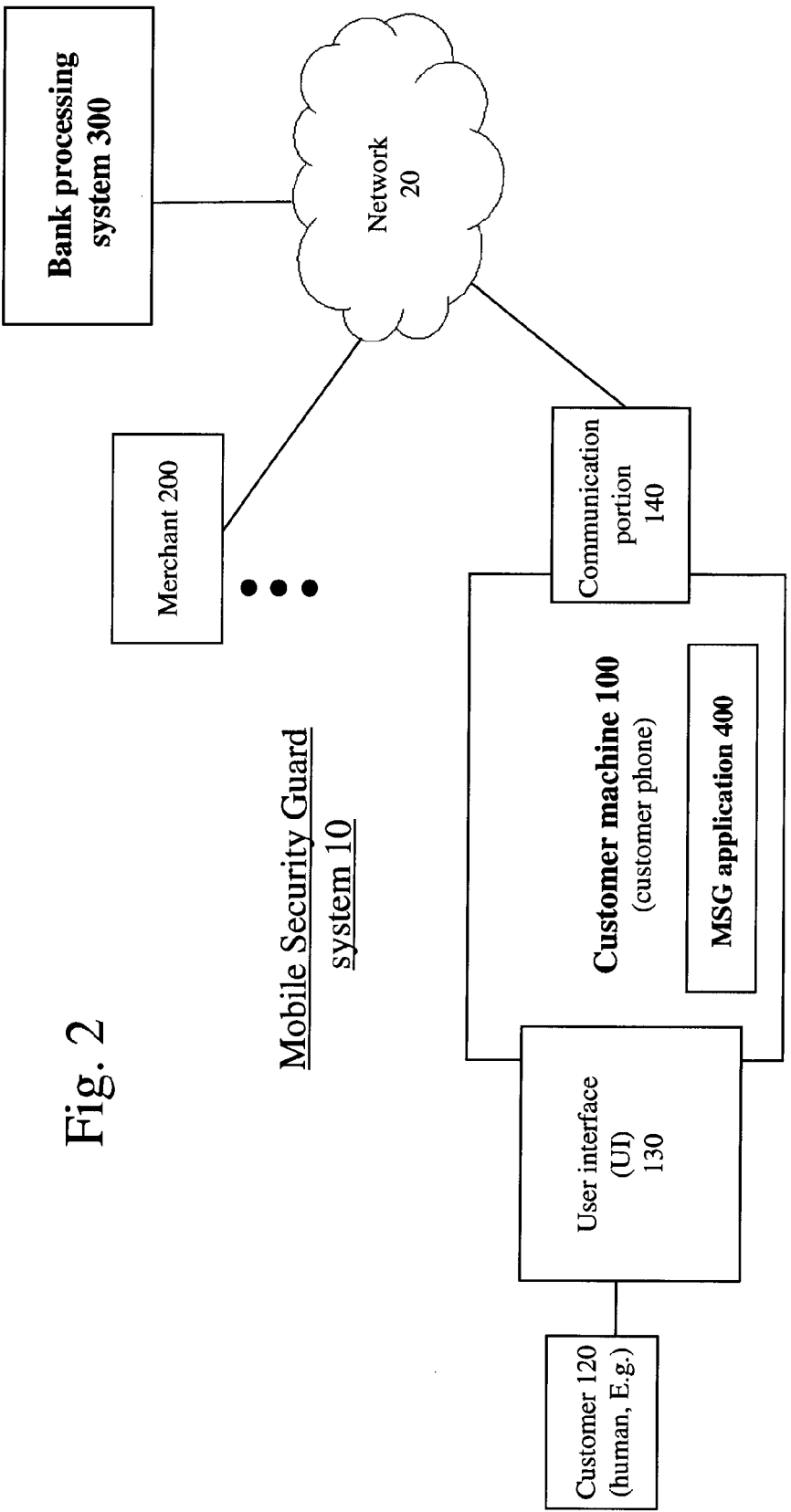
FIG. 2 is a block diagram showing further aspects of the MSG system, in accordance with one embodiment of the invention.

FIG. 2 is a block diagram showing further aspects of the MSG system 10, in accordance with one embodiment of the invention.

The MSG system 10, as described above, includes a customer machine 100 and a bank processing system 300. The customer machine 100 and the bank processing system 300 may interface in conjunction with various interactions, such as a series of communications over the network 20 (between the customer machine 100 and the bank processing system 300) to effect the MSG related functionality as described herein.

The MSG system 10 may also include a merchant 200. In accordance with some embodiments of the invention, the customer machine 100, the merchant 200, and the bank processing system 300 may variously communicate, i.e., such as in the situation of a requested purchase by the customer using the customer machine 100 (at the merchant 200) to effect a purchase of an item, while utilizing MSG functionality.

The customer machine 100 includes a user interface 130 and a communication portion 140. The user interface 130 provides for the customer machine 100 to interface with a human user 120. For example, the user interface 130 might be in the form of a keyboard/monitor. The communication portion 140 provides for the customer machine 100 to communicate with other processing systems, including, in particular, the merchant 200 and bank processing system 300.

Figure 3:
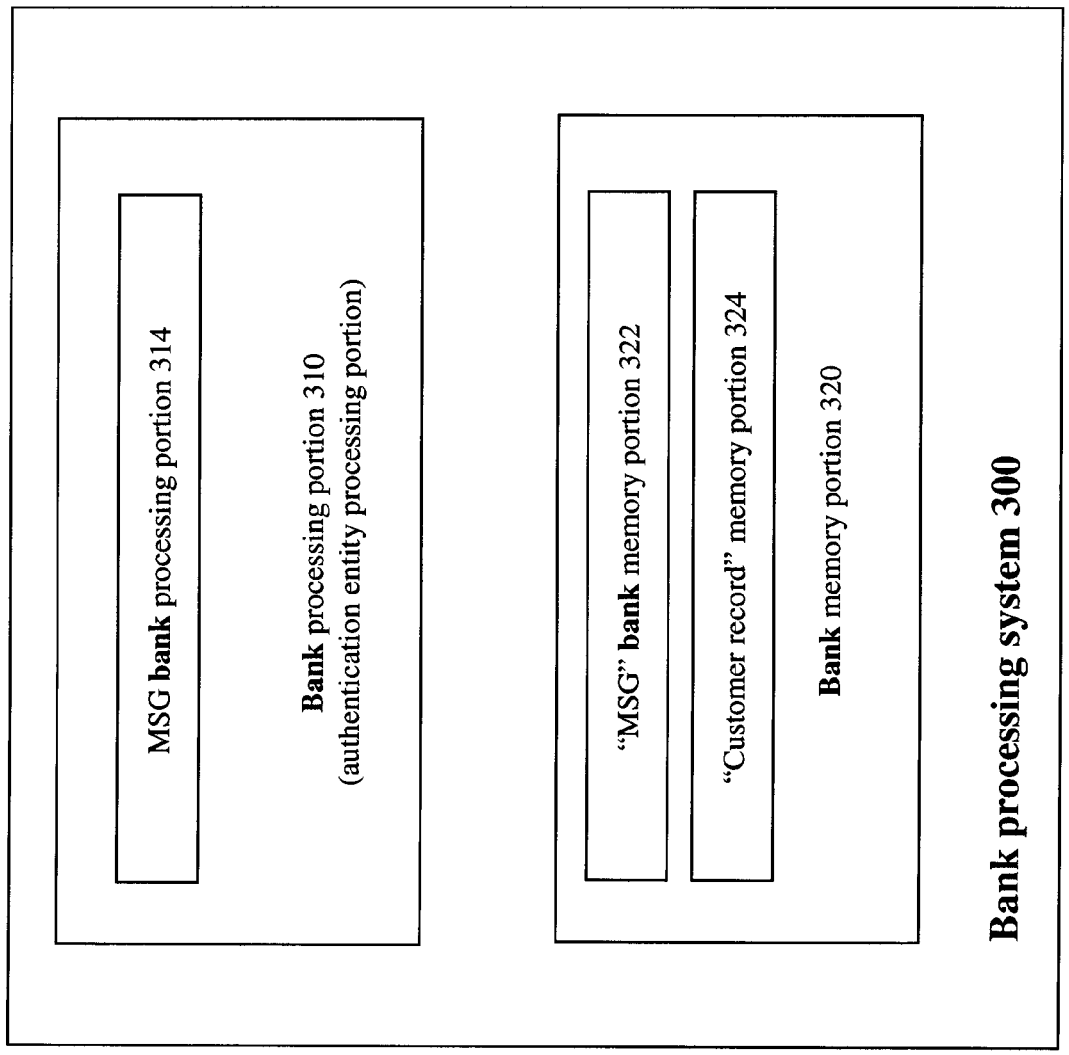
FIG. 3 is a block diagram showing further aspects of the bank processing system, in accordance with one embodiment of the invention.

FIG. 3 is a block diagram showing further aspects of the bank processing system 300, in accordance with one embodiment of the invention.

The bank processing system 300 may be in the form of a banking platform maintained by a bank, for example. The bank processing system 300 includes a bank processing portion 310 and a bank memory portion 320. The bank processing portion 310 may be in the form of a general purpose computer, special purpose computer, or some other tangibly embodied processing machine. The bank memory portion 320 may be in the form of a database, for example.

The bank processing portion 310 performs a wide variety of processing as described herein. In particular, the bank processing portion 310 includes an MSG bank processing portion 312. The MSG bank processing portion 312 performs various processing in conjunction with providing the MSG functionality as described herein.

The bank memory portion 320, in the bank processing system 300, is provided to store various data that is used and/or generated by the bank processing system 300. The bank memory portion 320 includes, in particular, an MSG bank memory portion 322 and a customer record memory portion 324. The MSG bank memory portion 322 stores various data associated with MSG processing, such as data generated or used by the MSG bank processing portion 314, for example. The customer record memory portion 324 stores customer records, as well as related customer data, in accordance with one embodiment of the invention.

Figure 4:
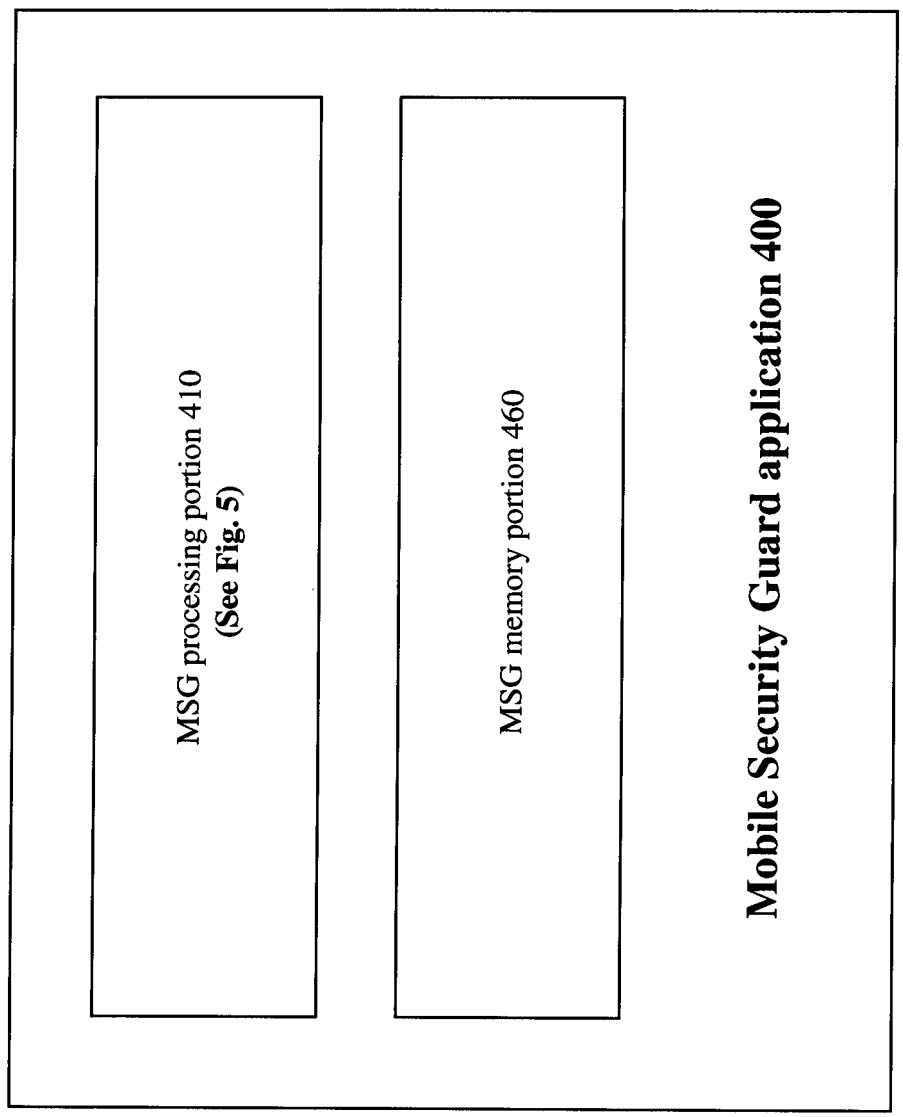
FIG. 4 is a block diagram showing the MSG application in further detail, in accordance with one embodiment of the invention.

FIG. 4 is a block diagram showing the MSG application 400 in further detail, in accordance with one embodiment of the invention. As shown, the MSG application 400 includes an MSG processing portion 410 and an MSG memory portion 460.

The MSG processing portion 410 performs various processing the of MSG application 400, as described herein. The MSG processing portion 410 may be in the form of code on a compute readable medium, such code providing the various functionality as described herein. In one embodiment, such code may be disposed on the same operating platform as supports the customer machine 100, e.g. as supports a cell phone. In other embodiments, such code may be distinct from the operating platform that supports the customer machine, e.g. the code might be disposed on a card that is physically inserted into the particular cell phone.

The MSG memory portion 460 is constituted by a database or any other readable medium In accordance with one embodiment of the invention, the MSG memory portion 460 stores various data that is either generated by the MSG application 400 and/or used by the MSG application 400.

Figure 5:
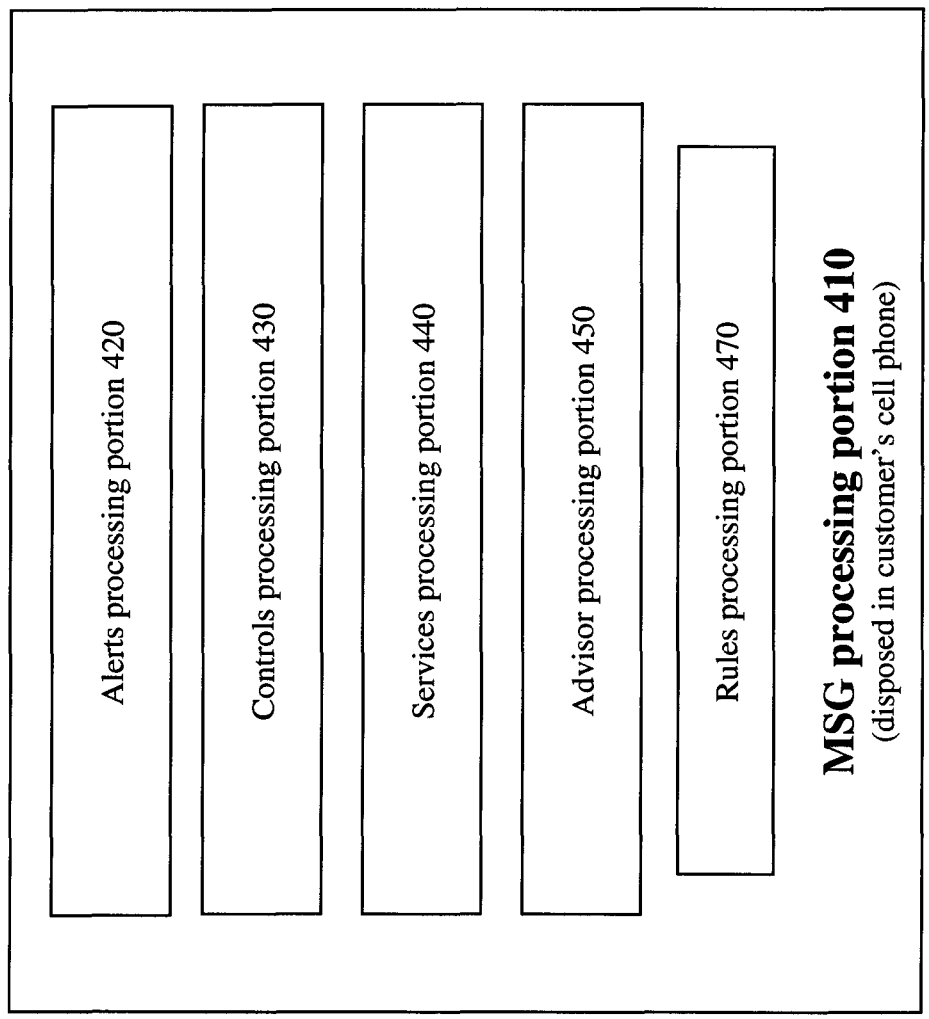
FIG. 5 is a block diagram showing the MSG processing portion 410 in further detail, in accordance with one embodiment of the invention.

FIG. 5 is a block diagram showing the MSG processing portion 410 in further detail, in accordance with one embodiment of the invention.

As shown, the MSG processing portion 410 includes an alerts processing portion 420, a controls processing portion 430, a services processing portion 440, an advisor processing portion 450, and a rules processing portion 470. The various processing of such portions are described below. In particular, the alerts processing portion 420 handles various processing associated with providing alerts to the customer relating to their particular account. The controls processing portion 430 handles various processing associated with a customer providing notifications to their bank relating to their particular account. The services processing portion 440 handles various processing associated with providing information (such as balance, available credit, and payment information) to the customer relating to their particular account. Further, the advisor processing portion 450 handles various processing associated with accessing customer service resources. The rules processing portion 470, in accordance with embodiments of the invention, may handle the various processing associated with the rules as described herein. In particular, the rules processing portion 470 may input particulars of a transaction and apply those particulars to the appropriate rule, generate communications in response to application of a rule, and input and/or change variables used by a rule (e.g. either in some automated manner or by input from the customer).

Figure 6:
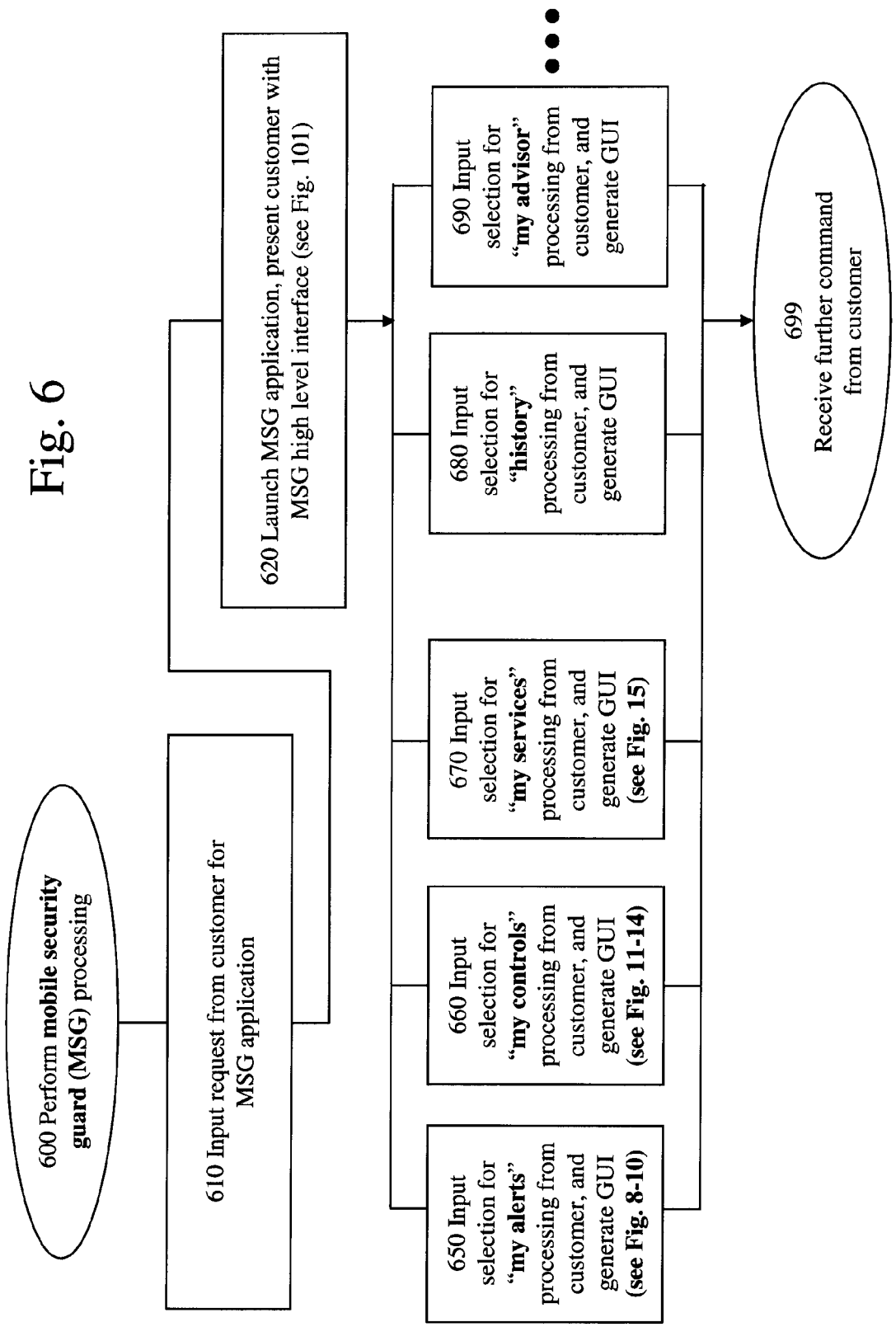
FIG. 6 is a high level flow chart showing aspects of the MSG processing, in accordance with one embodiment of the invention.

FIG. 6 is a high level flow chart showing aspects of the MSG processing, in accordance with one embodiment of the invention. As shown, the processing of FIG. 6 starts in step 600 and passes to step 610. In step 610, the MSG application 400 inputs a request from the customer for the MSG application, which is disposed in the customer's cell phone. Such interface might be in the form of the customer tapping an MSG icon displayed on the phone's interface. In response, the MSG application 400 launches the MSG application and presents the customer with an MSG high level interface. For example, such is illustrated by the interface 702, as shown in FIG. 7, described below.

Figure 7:
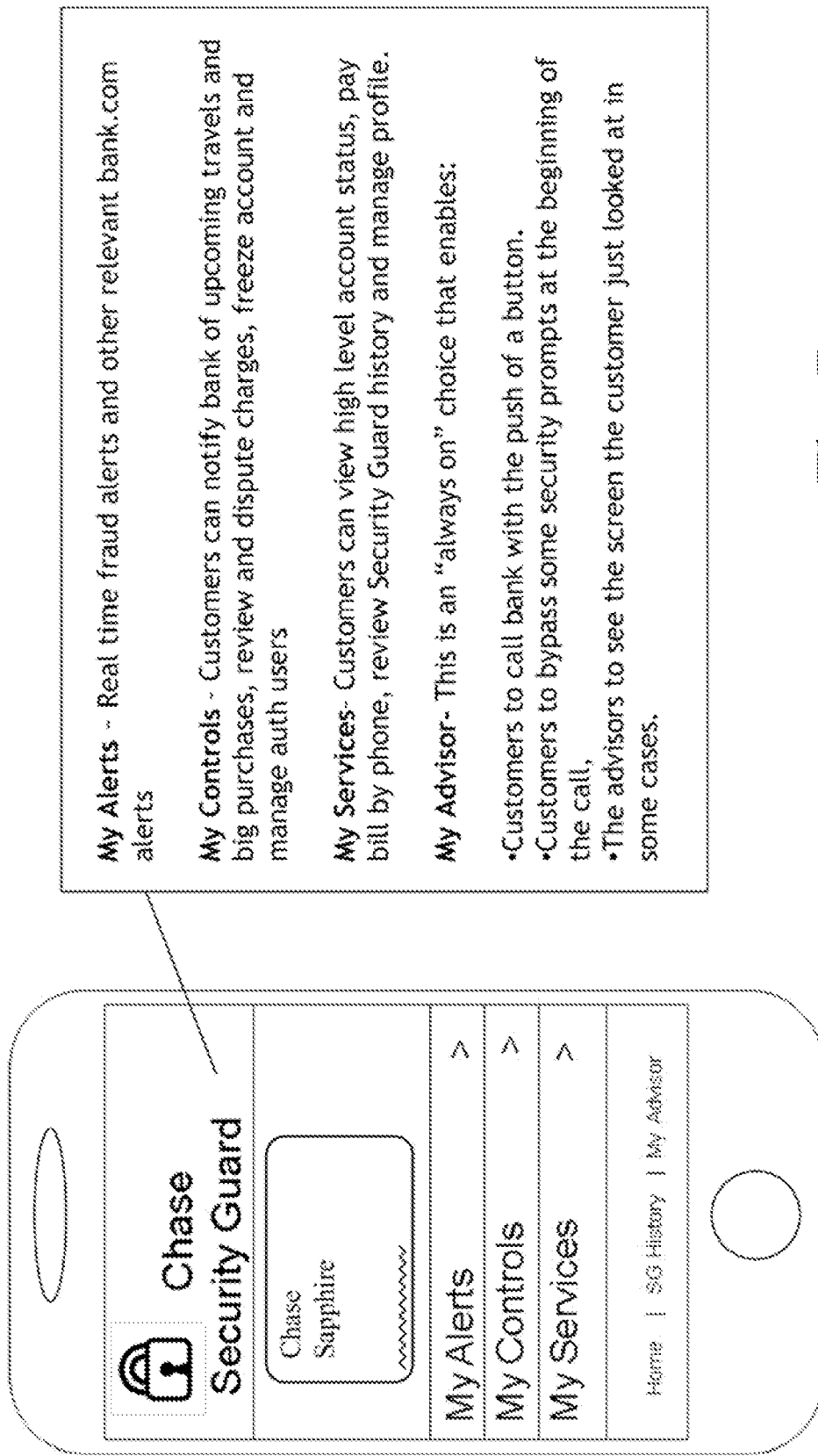
FIG. 7 is high level interface in accordance with one embodiment of the invention.

As shown in FIG. 7, the interface 702 includes a My Alerts selection, a My Controls selection, and a My Services selection. Accordingly, the customer can chose any of these 3 selections, in order to be presented with further options associated with the particular chosen selections.

In addition, the interface 702 includes a Home selection, an SG (Security Guard) selection, as well as a My Advisor selection. In accordance with one embodiment of the invention, the Home selection returns the user to the high level interface of FIG. 7. The SG History selection may be selected by the user to display various aspects of history regarding use of the MSG application. Further, the My Advisor selection provides various contact information for the customer's use as well as other capabilities, as described further below.

The further processing of FIG. 6 reflects that the customer may select any of these selections and, as a result, be presented with further options. Step 650 of FIG. 6 reflects that the customer may select My Alerts; step 660 reflects that the customer may select My Controls; step 670 reflects that the customer may select My Services; step 680 reflects that the customer may select History; and step 690 reflects that the customer may select My Advisor. For each of the selections 650-690, the MSG application 400 presents the customer with a further interface and/or further options.

After any of steps 650-690, the process passes to step 699. In step 699, the MSG application 400 receives a further command from the customer. For example, this further command may be in the form of any of the selections 650-690. Alternatively, the customer may simply select to exit the MSG application 400.

Figure 8:
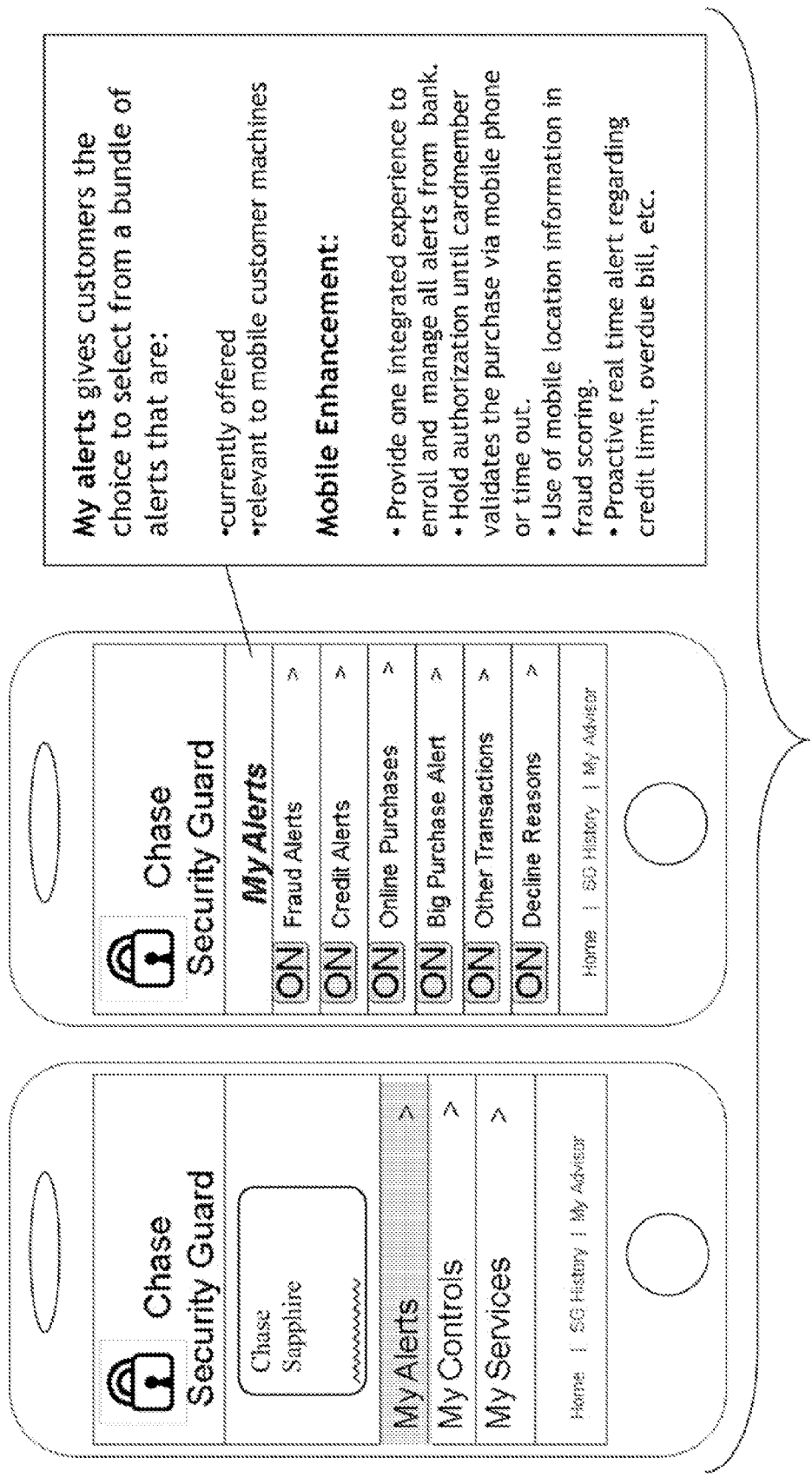
FIG. 8 is a diagram showing a user interface (GUI) that further illustrates the My Alerts functionality in accordance with one embodiment of the invention.

FIG. 8 is a diagram showing a user interface (GUI) 802 that further illustrates the My Alerts functionality in accordance with one embodiment of the invention. The My Alerts interface 802 gives a customer a choice to select from a bundle of alerts. As shown, in accordance with one embodiment, such alerts include a Fraud Alert, Credit Alert, Online Purchases, Big Purchase Alert, Other Transactions, and Decline Reasons. Various other alerts may be provided as desired. The customer may turn ON or OFF each of these alerts as desired by the customer. Accordingly, the My Alerts interface provides one integrated experience for the customer to enroll and manage all the alerts that are associated with their account, such as a credit card account. For example, a customer may hold authorization until the card member validates the purchase via their mobile phone or an applicable "time out" is reached, as described below. The alerts may use mobile location information such as in fraud assessment, as described herein. Further, the My Alerts may provide a real time alert regarding credit limit, an overdue bill, or other situations, for example.

More specifically, as shown in FIG. 8, the Fraud Alert is provided to alert a customer when particular activity is detected that is indicative of fraud. For example, the detection of such fraud may be based on a set of rules disposed in the MSG application 400. For example, a rule may be provided that upon a first transaction and a second transaction being requested in proximity (in terms of time) to each other, the MSG application 400 compares geographical location information for the 2 transactions. If the location information, e.g. the zip code, are so disparate so as to not be possible, then a fraud alert is triggered.

The interface 802 may include a Credit Alert. For example, the Credit Alert may be triggered based upon certain thresholds being attained in a customer's line of credit. For example, if the credit limit of an account is approached, then the customer might receive an alert to advise them of such a situation. The interface 802 also includes an Online Purchases alert. This alert may be triggered any time a purchase is made online.

The interface 802 also includes a Big Purchase alert. This alert may be triggered any time a particular large purchase is effected that exceeds a particular threshold. The customer may be provided the capability to set the threshold as desired. For example, the customer might set a threshold such that any purchase over $200 would result in an alert being sent to their phone. The customer could then approve or disapprove the particular transaction.

The interface 103 also includes an "Other Transactions" alert. For example, this alert may be triggered based on some transaction being requested that is out of the normal routine.

The interface 802 also includes a "Decline Reasons" alert. This alert may provide the functionality that the customer is forwarded text, to their cell phone, showing the reasons for any decline in their account and/or credit cards associated with their account. As described above, fraud alert processing may be provided to alert a customer when particular activity is detected that is indicative of fraud. For example, the detection of such fraud may be based on a set of rules disposed in the MSG application 400. As described in the example above, a rule may be provided that relies on proximity of time and/or location.

In accordance with embodiments of the invention, various other fraud related processing may be provided, which in general may provide the customer with desired/beneficial information. Such processing may be performed by either the bank processing system 300, the MSG application 400 or some other processing portion. In general, such fraud processing may be based on rules, and in particular, applying such rules to data that is secured. Such data may relate to a transaction, particulars of the customer machine 100 and/or other data. In accordance with one embodiment, the customer establishes rules that relate to planned operation of the device. For example, a customer, may know they typically only use a particular customer machine 100 in close proximity to home. The MSG application 400 allows the customer to set up a rule to reflect such planned behavior. For example, the customer sets up a rule that the particular customer device will only be used within 20 miles of the customer's home. The rule may further sets out that if used more than 20 miles, then the customer will be contacted, in some manner, in order to confirm the transaction. For example, the customer may receive a call on their cell phone to confirm the particular transaction.

Figure 19:
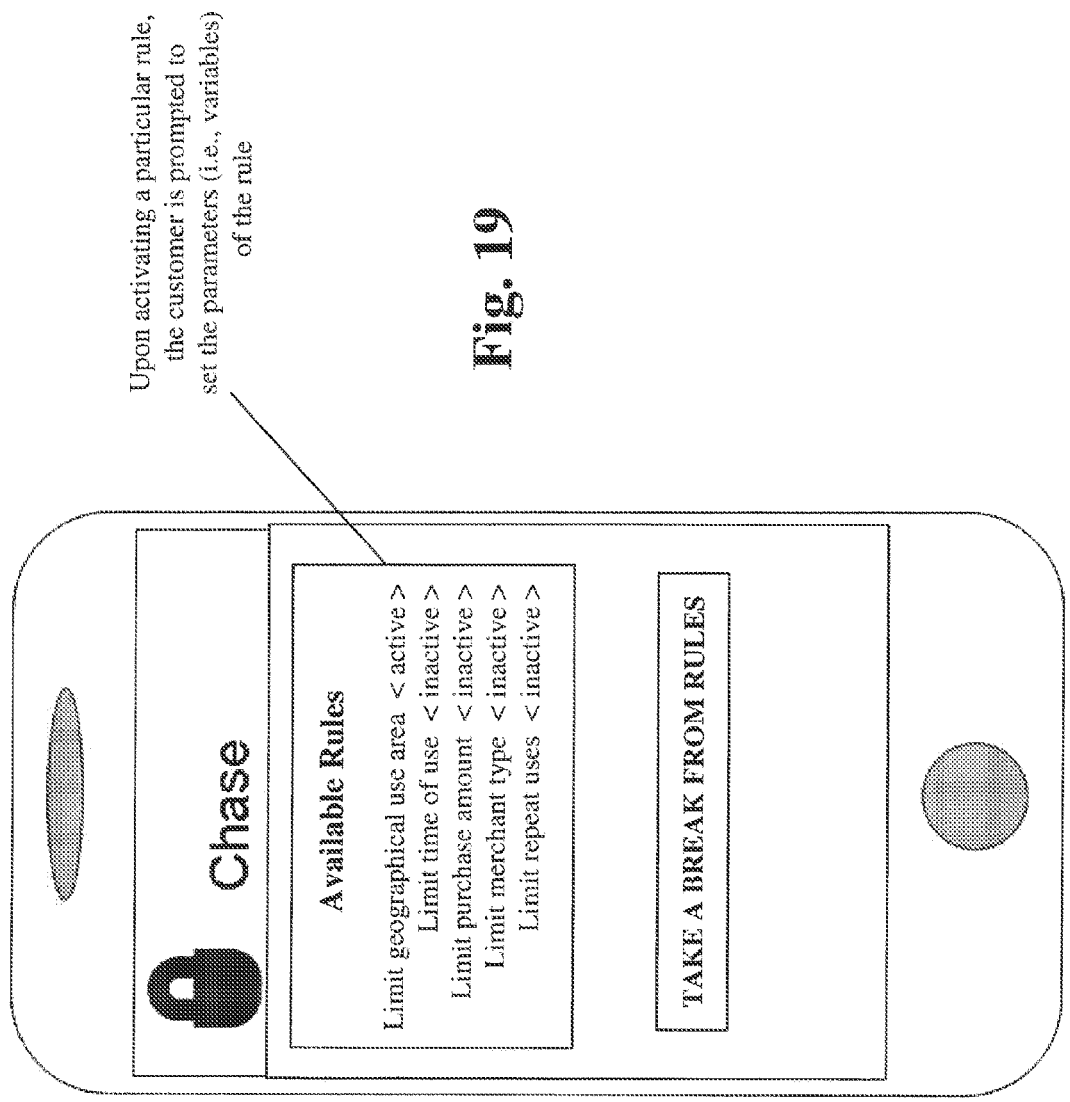
FIG. 19 is a diagram showing an interface presenting rule options to the customer in accordance with one embodiment of the invention.

The rules may be disposed in the form of computer code in either the MSG application 400 and/or the bank processing system 300, for example. A particular rule may be either activated or deactivated by the customer. FIG. 19 is a diagram showing an interface presenting such rule options to the customer in accordance with one embodiment of the invention. That is, the customer may be presented with the various rules that the customer may choose from, i.e., that the customer may activate. The customer may activate a particular rule in any suitable, such as by the customer tapping the interface shown in FIG. 19, which toggles the rule between active in inactive. Upon the customer activating a particular rule, the customer is then presented with any parameters, i.e., variables, that are needed to use the rule. For example, if "limit geographical use area" is activated, then variables might include selecting the customer's home as a starting point and limiting transactions to within 20 miles of that starting point. If outside of the area, the customer might select a communication channel by which they would be contacted. It is of course appreciated that other geographical schemes might be used in lieu of a center point and distance, e.g. such as designating a use area to be a particular county, for example.

The interface of FIG. 19 illustrates that rules presented to the customer might relate to geographical use area, time of use, purchase amount, merchant type, and/or to limit repeat uses. It is appreciated that various other rules, dependent on different parameters. may be implemented as desired. Further, the particular variables that are associated with any particular rule may be varied. That is, such rules and associated variables may be varied in terms of what the MSG application 400 or bank processing system 300 presents to the customer as options, as well as varied in that the customer may widely vary the particular variable values (upon activating a particular rule).

The invention, i.e., the MSG application 400 or the bank processing system 300 for example, may also provide the ability for the customer to "take a break" from a particular rule or rules. That is, as described above, the customer is presented with rules that they may or may not activate. Upon activation of a rule, the customer is then presented by variables that are used in implementation of the rule. Multiple rules may be activated and in use at one time. Accordingly, the invention provides for functionality that the user may take a break from one or more rules.

In further explanation, in accordance with one embodiment of the invention, the customer may be provided a "take a break from rules" option, as shown in FIG. 19. Upon the customer selecting such option, the customer indicates which rules (or all rules) to take a break from, and for how long. For example, the customer might take a break from all rules for 10 hours while the customer is on a trip out of town. Accordingly, such functionality provided by the MSG system 10 allows the customer to easily deviate from their normal routine, as such routine is represented by the rules the customer has put into place. The customer can, in other words, be different for a day: and perform transactions in the different situation, without being barraged by a flurry of communications from the MSG system 10 indicating that their rules are being violated.

Relatedly, in embodiments, the rules may take into account (based in information input from the customer) future travel plans. For example, the customer may specify dates in advance that the rules are to be suspended and/or changed, e.g. customer suspends the rules from December 1 to December 4 and for such time period changes their "home" location to Paris.

In accordance with one embodiment of the invention, the MSG system 10 may, upon detecting a change in the rules by the customer, trigger other functionality. For example, the MSG system 10 may detect particular changes and, based on historical data, conclude that such input changes are indicative of travel plans of the customer. For example, if the customer changes their "home" location from Wilmington, Del. to Paris, France, then the MSG system 10 would tag that as indicative of a trip. As a result, various functionality may be provided/presented to the customer. Such functionality may include providing the customer with an option of travel insurance, hotel options, network options (by which their communication might be enhanced) and/or other purchase options associated with the trip. Indeed, such observed "change in rules" by the customer may afford in ingress into the customer's travel thoughts at an advanced time, i.e., when the customer is still in the travel formulation stage and perhaps more amenable to purchase options presented to him. That is, otherwise, the first indication the customer is traveling may well be when the bank processing system 300 starts receiving transaction approval requests from the customer, as they are traveling. As can be appreciated, at this stage in a trip, much of the customer's travels plans have already been solidified, thus limiting the purchase options that the customer is likely to be open to.

Figure 9:
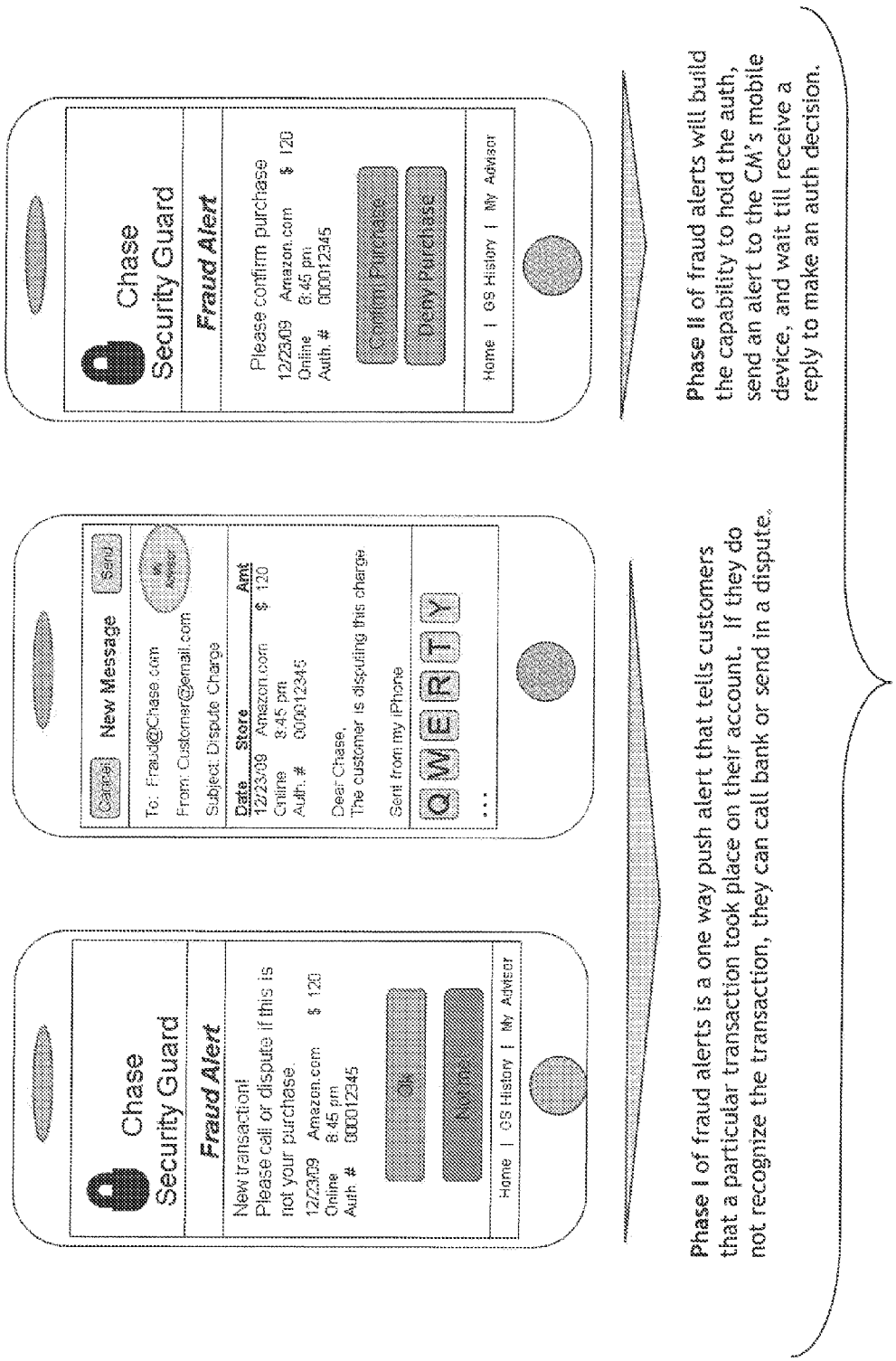
FIG. 9 is a diagram showing further interfaces associated with the My Alerts in accordance with one embodiment of the invention.

FIG. 9 is a diagram showing further interfaces and functionality associated with the My Alerts in accordance with one embodiment of the invention. Specifically, FIG. 9 shows further illustrative aspects of a fraud alert. In accordance with one characterization of the fraud alert, Phase 1 of the fraud alerts is constituted by a one way push alert that tells a customer that a particular transaction has taken place on their account. The alert advises the customer that if they do not recognize the transaction, then they can call the bank regarding the transaction, or alternatively, send in a dispute regarding the transaction. In a second phase, Phase 2 of the fraud alert as characterized in FIG. 9, the MSG application 400 provides the capability to hold an authorization. Specifically, the MSG application 400 receives a request for a transaction, and holds the authorization for that transaction. The MSG application 400 sends an alert to the customer's mobile device and waits until a response is received from the customer. The MSG application 400 may simply wait until a response is received from the customer, with no other options. Alternatively, the wait may simply time-out, meaning that if the MSG application 400 does not receive a response back (from the customer) in a particular period of time then the transaction will automatically be authorized. Alternatively, the particular rule may provide that absent a response from the customer, then the transaction will be declined automatically.

Figure 10:
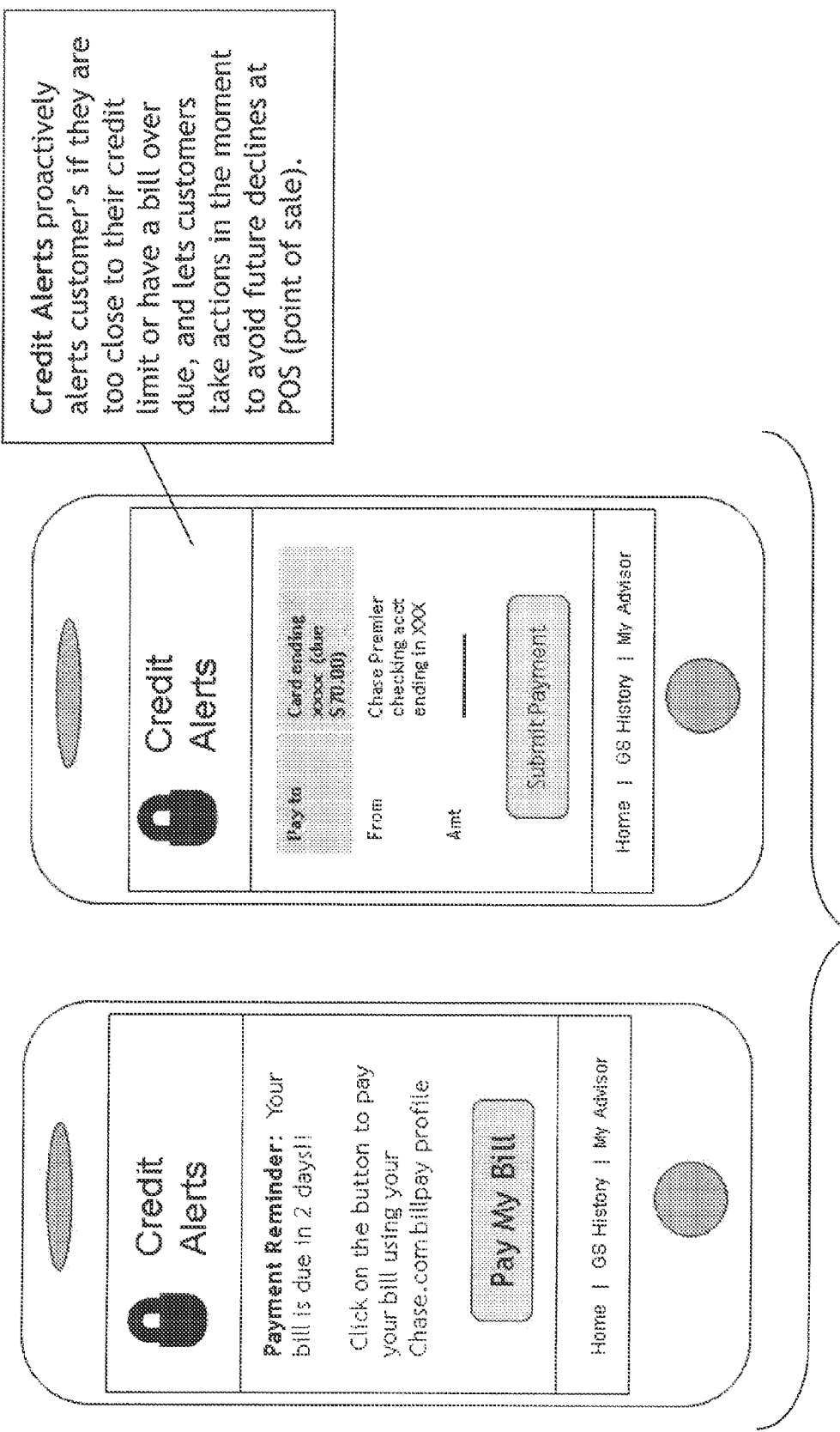
FIG. 10 is a diagram showing further details of a Credit Alert in accordance with one embodiment of the invention.

FIG. 10 is a diagram showing further details of a Credit Alert in accordance with one embodiment of the invention. In one embodiment, Credit Alerts proactively alert customers if they are too close to their credit line or have a bill overdue, or alerts the customer of other situations. As a result, the Credit Alerts let the customers take action at that point in time to avoid future declines at a point of sale, or other adverse action to the customer. In the example of FIG. 10, the Credit Alert advises the customer that their bill is overdue for 2 days. The alert gives the customer the ability to pay their bill and continue using their card without finance charges being applied, in this particular example.

Figure 11:
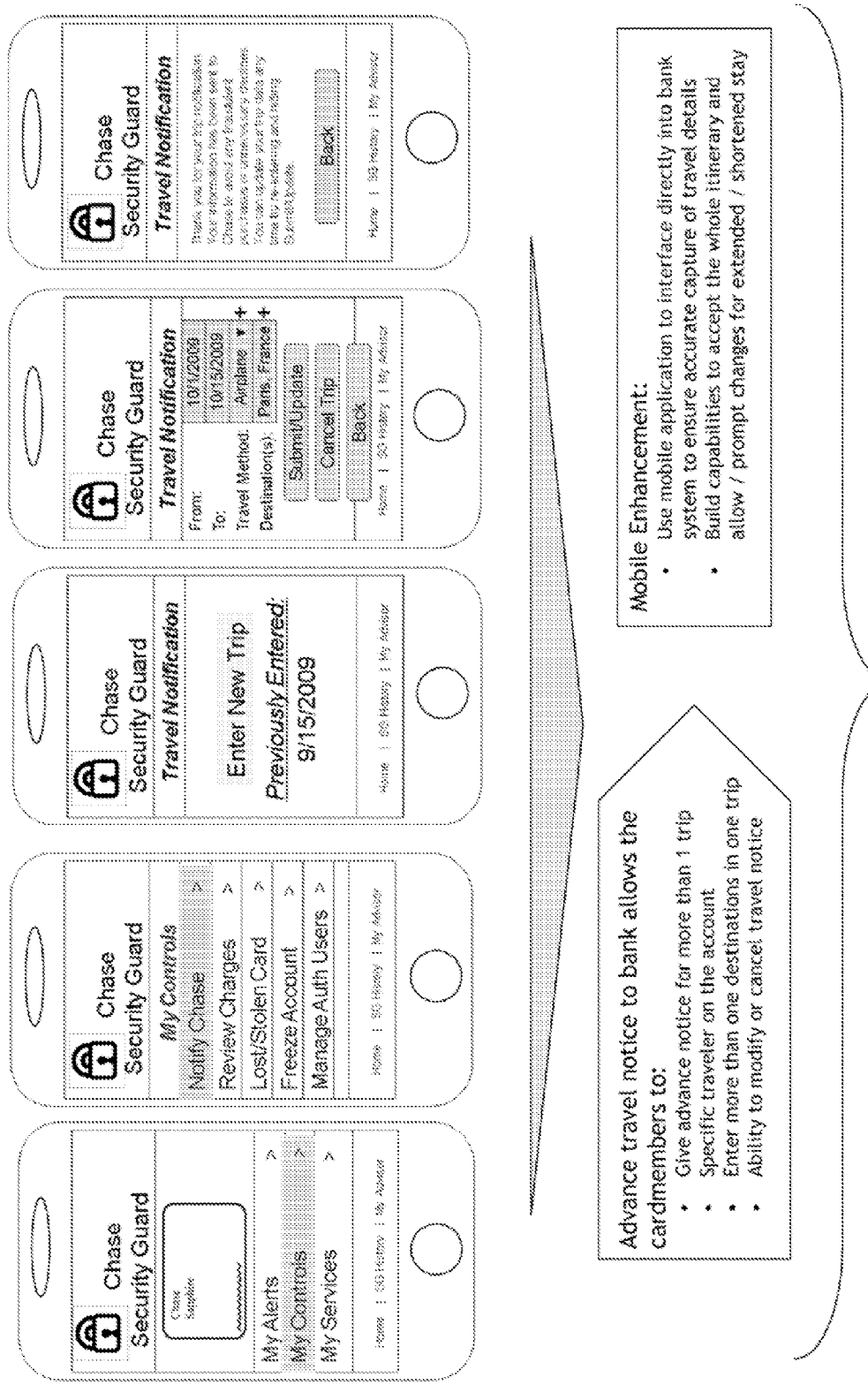
FIG. 11 is a diagram showing further interfaces for My Controls, in accordance with one embodiment of the invention.

FIG. 11 is a diagram showing further interfaces for My Controls, in accordance with one embodiment of the invention. The interfaces of FIG. 11 illustrate that a customer may advise their bank of travel plans, which the customer is planning to take. As described above, such functionality allows a customer to give advance notice for one or more trips; specify the particular person on the account that will be traveling; enter a plurality of destinations in one trip; and modify or cancel their travel notice, for example. Accordingly, such features allow a user, via the MSG application 400, to interface directly into the bank system to insure accurate capture of travel details. The processing may provide capabilities to accept an entire itinerary, as well as to allow prompt changes for an extended or shortened stay. In accordance with one embodiment of the invention, a particular set of rules are associated with the information that is provided by the customer regarding their travel plans. Accordingly, based on the travel information obtained from the customer, such rules will control whether a particular transaction is or is not acceptable. The rules may rely on time factors, geographical factors, or any or factor vis-à-vis the travel information obtained from the customer, as described above. As also described above, a customer may select which rules are activated, as well as the particular parameters upon which the rules operate, e.g. the dates the customer will be out of the country.

Figure 12:
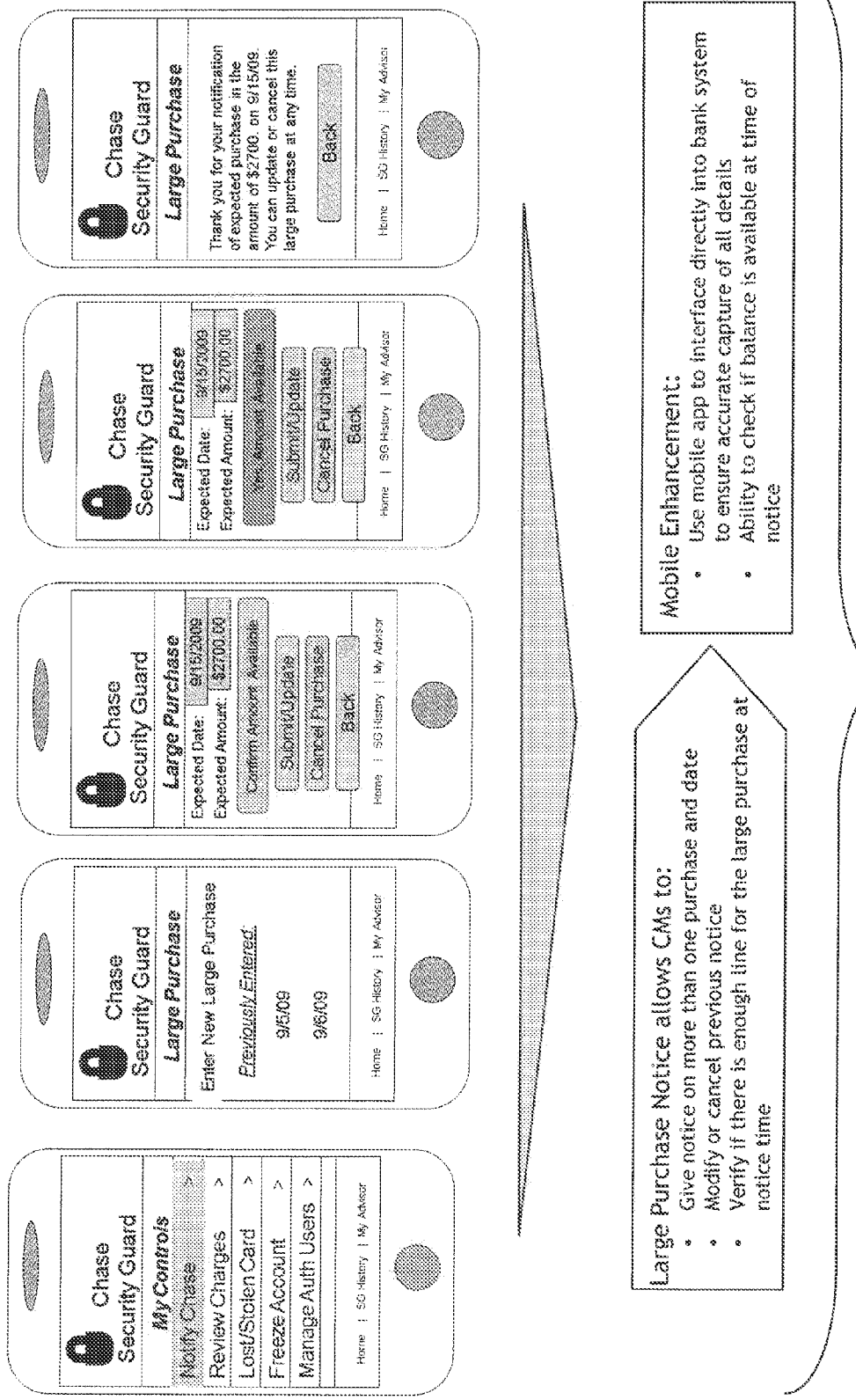
FIG. 12 is a diagram showing further interfaces illustrating the My Controls functionality in accordance with one embodiment of the invention.

FIG. 12 is a diagram showing further interfaces illustrating the My Controls functionality in accordance with one embodiment of the invention. The example of FIG. 12 illustrates a customer providing notice to the bank of a large purchase. Such large purchase notice allows a customer to give notice on one or more purchases, and the date that those purchases are expected. The customer may modify or cancel previous notices regarding purchases, as well as to confirm or verify that there is sufficient line of credit, for the large purchase, at the particular point in time. Accordingly, in the processing of FIG. 12, the MSG application 400 interfaces directly into the bank system to insure accurate capture of all the details provided by the customer, as well as accurate reporting of relevant data back to the customer, i.e., such as advising the customer whether there is sufficient monies available to fund a purchase.

Figure 13:
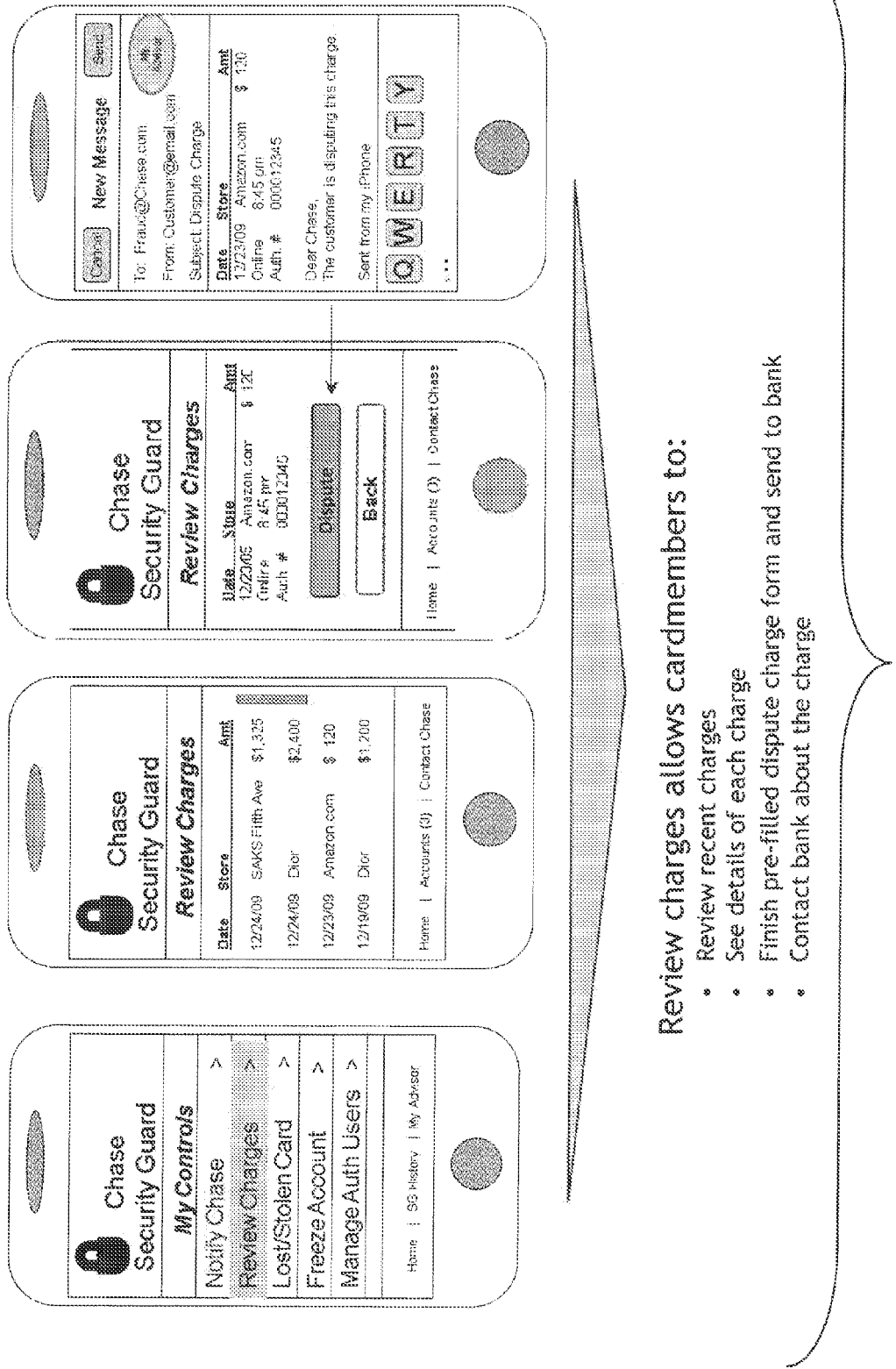
FIG. 13 is a diagram showing further interfaces relating to the My Controls functionality in accordance with one embodiment of the invention.

FIG. 13 is a diagram showing further interfaces relating to the My Controls functionality in accordance with one embodiment of the invention. Specifically, the interfaces of FIG. 13 show that a user, using the My Controls functionality, can review various charges associated with their account. More specifically, a user may review recent charges applied to their account, see details of each charge, and generate and submit a dispute charge form, relating to the charge, i.e., if the customer deems that the charge is incorrect. In accordance with one embodiment, as shown in interface 1308, of FIG. 13, the dispute charge form may be pre-populated for submission by the customer, upon the customer selecting the dispute option in interface 1306.

Figure 14:
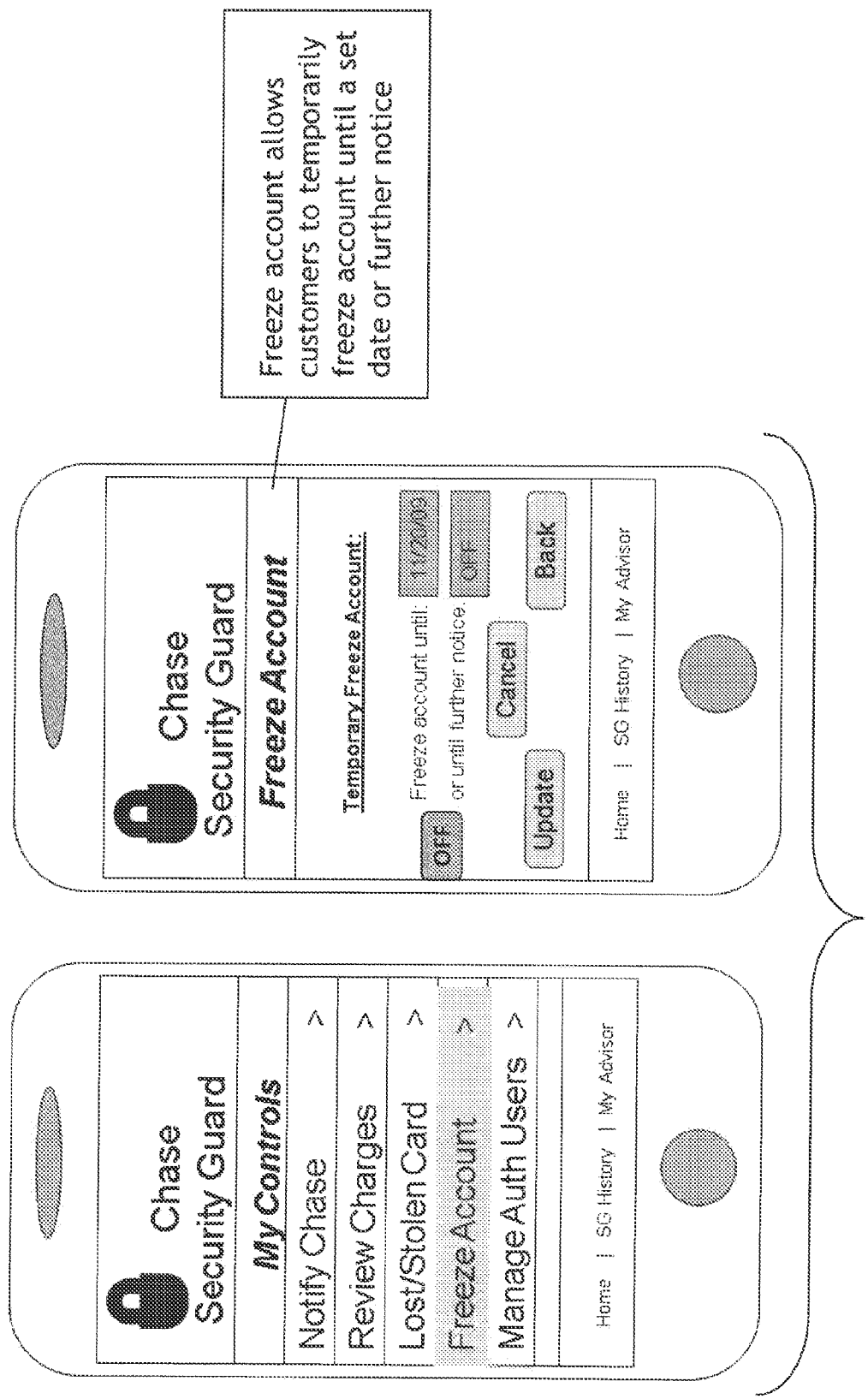
FIG. 14 is a further diagram showing interfaces reflecting the My Controls functionality in accordance with one embodiment of the invention.

FIG. 14 is a further diagram showing interfaces reflecting the My Controls functionality in accordance with one embodiment of the invention. Specifically, the My Controls functionality, as shown, may provide the user the ability to freeze an account. The freeze account functionality allows a customer to temporarily freeze an account until a set date, some other triggering event, or simply to freeze the account until further notice is received from the customer to unfreeze the account. For example, the customer might freeze an account if they have misplaced their credit card, but believe that they will find it at some future time.

Figure 15:
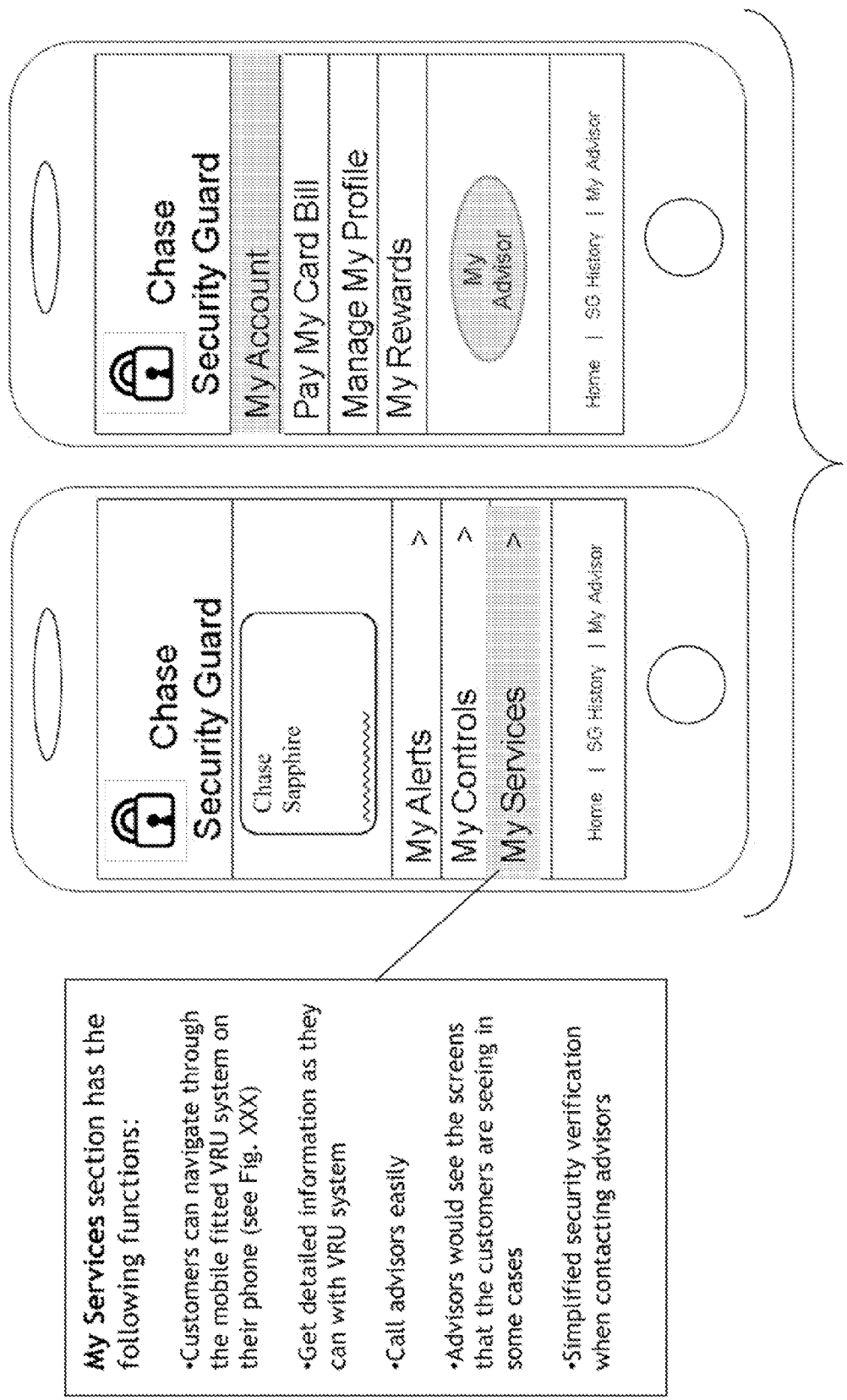
FIG. 15 is a diagram showing interfaces that illustrate the My Services functionality in accordance with one embodiment of the invention.

FIG. 15 is a diagram showing interfaces that illustrate the My Services functionality in accordance with one embodiment of the invention. In embodiments of the invention, the My Services functionality provides various functions related to providing information to the customer, to assist the customer in performing a particular task or to assist the customer in investigating a perceived problem, related to their account, for example. One function provides customers the ability to navigate through a mobile fitted voice recognition unit (VRU) system maintained by the MSG application 400 on their phone. Relatedly, the customer may get various detailed information from their interaction with the MSG application 400 VRU system. A further function provided by the My Services functionality is to provide the customer with the ability to call/contact advisors, i.e. customer service persons, easily. In accordance with one embodiment, such advisors would see the screens, i.e., the interface on the customer's cell phone, that the customer is seeing. Relatedly, security verification protocols may be simplified and/or some way reduced when contacting such advisors.

As described herein, the MSG application 400 may be disposed in a cell phone (or other customer device) and provide a wide variety of functionality. In the current technological world, it is commonplace for a customer to possess multiple mobile devices. In accordance with one embodiment of the invention, a customer may register their various mobile devices with the MSG bank processing portion 314. as well as with each MSG application 400 on their respective devices 100. In particular, the customer may register their device with an MSG application 400 on, or associated with, the particular device. This might be performed automatically (e.g. when the MSG application 400 is loaded on to the customer device) and/or might result from a series of prompted keystrokes performed by the user, for example.

Upon the particular device being registered with the particular MSG application 400, the MSG application 400 may then register the particular mobile device with the MSG bank processing portion 314, i.e., with the bank processing system 300. Thereafter, the MSG bank processing portion 314 may register that particular device with other MSG applications 400 on other customer devices. As a result, what might be characterized as a library of devices is generated in both the customer devices 100, as well as in the MSG bank processing portion 314.

Figure 20:
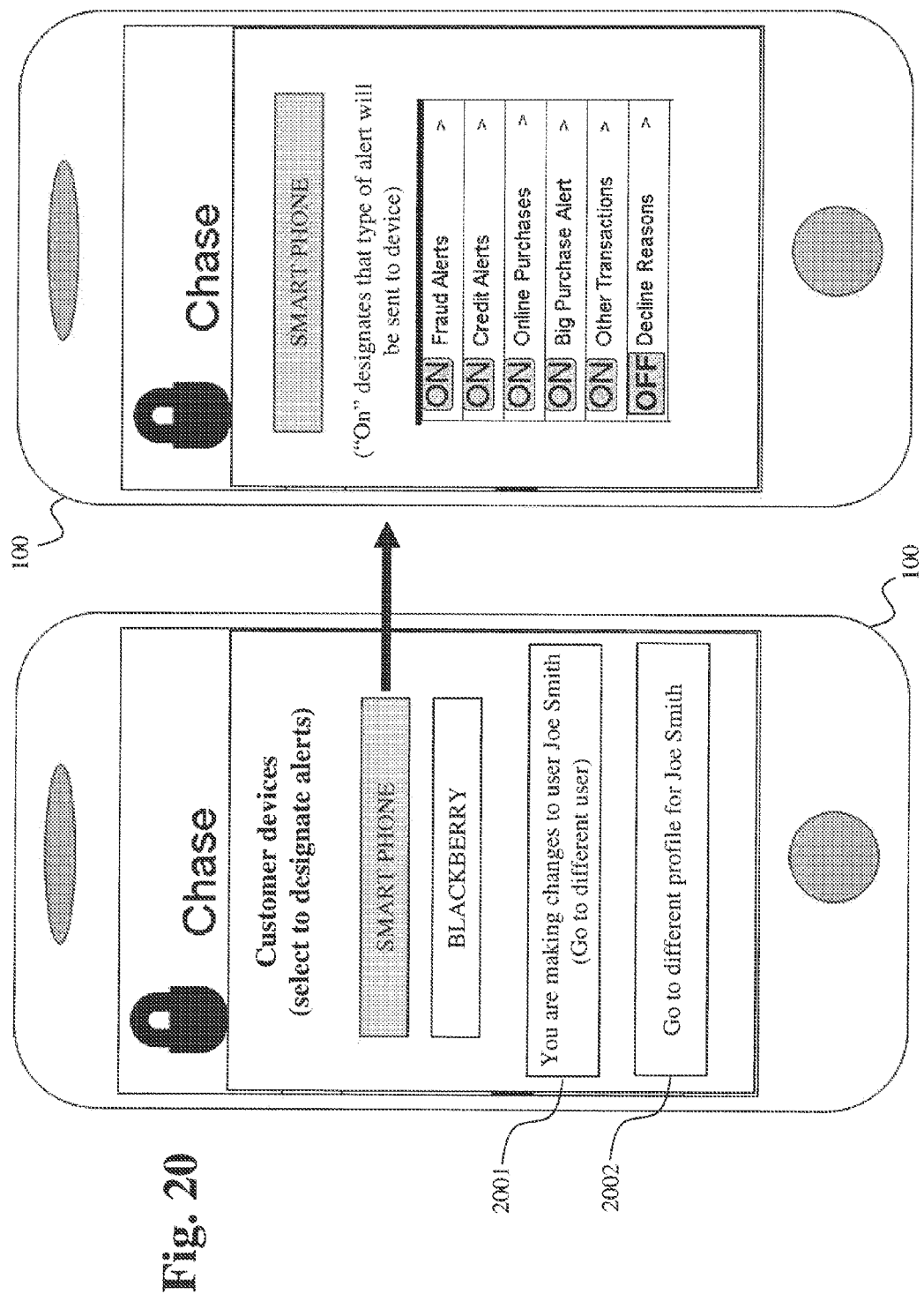
FIG. 20 is a diagram showing an interface presenting communication options to the customer in accordance with one embodiment of the invention.

As a result of the registration of the various customer devices, various functionality may be provided. In one embodiment, the customer may select which type of communications should be sent to which customer machine 100, i.e., which customer device. For example, FIG. 20 is a diagram showing an interface presenting communication options to the customer in accordance with one embodiment of the invention. In the example, the customer selects her "smart phone" and is then presented with various types of alerts, which the customer may select to turn "on" or "off." In the example of FIG. 20, based on her selections, the customer will receive all the listed alerts on her smart phone, except for the "decline reasons" alert. In accordance with embodiments of the invention, the various types of communications (to a customer device) described herein may be presented to the customer in a manner similar to FIG. 20, from which the customer may choose to receive or not receive such communications. Such functionality allows the customer to designate which type of communications they want to receive on which devices.

Relatedly, once the customer selects which communications a particular device will receive, the customer may further be presented with functionality to specify the particular form of communications, i.e., whether the communication will be a phone call, e-mail, or text message, for example.

As described above, various options may be provided to a customer, i.e., a user. Relatedly, with further reference to FIG. 20, a customer machine 100 may include functionality, as reflected in the interface icons 2001 and 2002. That is, the customer machine 100 reflects that the MSG system 10 provides the ability to change options (i.e., any of the options described herein) for a different user, as well as to change options for different profiles of the same user. For example, a user may want to change alert options for their son or spouse. On the other hand, a user may have different profiles that are respectively associated with different accounts or different payment mechanisms, for example. For example, a user might have a personal account, as well as a corporate account. That user may well want different options for such two accounts, such as different alert options. The provision of the different options may be controlled by the MSG processing portion 410 in the form of computer code in the rules processing portion 470, for example.

In accordance with embodiments of the invention, it is appreciated that a wide variety of information may be utilized to provide an enhanced experience to the customer using a customer device. Various examples are described herein. For example, the MSG application 400, on a particular customer device, may be alerted to use of other application, e.g. a weather application, on that same device. Based on such use, the MSG application 400 deems that the particular device is in use on that day. This detection of the device being used may then be used, i.e., leveraged, by both the MSG application 400, and well as the MSG bank processing portion 314.

For example, based on a some suitable previous instruction from the customer, communications from the MSG bank processing portion 314 might be sent to all the customer devices that are deemed to be in use on that particular day. Such detected use of a device might also be used in fraud assessment. For example, if a location of a device's detected use is identified, and that location is 20 miles away from a requested transaction purportedly using the device, then such is indicative of fraud.

In accordance with one embodiment of the invention, a customer device, i.e., customer machine, 100 may be provided with functionality to deal with the loss or theft of the particular. For example, the device may be provided with a MSG application 400 self destruct feature, remote locking feature, remote kill feature, remote wiping feature, or some other similar technology. Such disablement features might be activated in any suitable manner, such as by a transmission to the device (from the MSG bank processing portion 314 upon the customer reporting the device lost) or by some other triggering event. Fore example, if an incorrect password is attempted three times or if the device experiences a non-use period, for example, then disablement might be triggered.

In accordance with further aspects of the invention, it is appreciated that the MSG application 400 may use, or be used in conjunction with, various other functionality included on a particular customer device. For example, the customer device may well have a camera. In an embodiment, the customer may take a picture of a receipt or some other documentation that is associated with a particular transaction. Such picture may then be associated with the transaction in some manner. For example, upon a picture, i.e., image, being input into the customer device within some time period, e.g. 5 minutes of a transaction, the MSG application 400 may associate such image with the particular transaction. The MSG application 400 might confirm such association by requesting confirmation from the customer. Optical character recognition (OCR) may be used to convert content on the image to text. The contents of the image, including the text derived there from, may then be used by the MSG application 400 and/or the bank processing system 300 as desired. For example, the MSG bank processing portion 314 might use the content in conjunction with authorization of the a transaction, might include the content with the customer's monthly statement, or use the content for various other processing, for example.

In embodiments, the MSG application 400 may use other processing to associate a particular image with a transaction. In one embodiment, physical receipt is provided with a bar code or some other identifying indicia, such as a unique number. Upon a picture being taken around the time, e.g. within 5 minutes, of the transaction, the MSG application 400 processes the picture to identify any such bar code or indicia. Any identified bar code or indicia (that is identified) may then be matched with the particular transaction. Once the receipt is associated with the transaction, further processing may be performed either by the MSG application 400, the MSG bank processing portion 314, a merchant, as described above.

Accordingly, as is described above, the MSG system turns a mobile phone into an enhanced security and premium experience device, which is in particular a valuable tool for customers on the go. The invention enhances fraud prevention of credit cards or other accounts through various control of alerts, early charge examination, protection of card when not in use/stolen, notification to the bank of spending patterns, and immediate phone connect for support as well as answers to various requested information. The invention is aimed at delivering a superior, relevant customer service experience that drives a shift to self serve through mobile interaction, while the customer is on the go, and allows the customer to activate rules (such as alert rules) as desired, as well as to control parameters upon which the rules are based. The invention also provides visible evidence of anti-fraud work by the bank.

Accordingly, in summary, the MSG system enables customers to manage credit and fraud alerts through the mobile device, review and dispute charges for early fraud detection, report lost or stolen cards for immediate card disenablement, report large purchases, report travel notification for future spending pattern analysis, interface with VRU based technology, and provide enhanced access to service support representatives.

FIG. 16 is a diagram showing an interface 1602 that illustrates a listing of credit card alerts in accordance with one embodiment of the invention. For each of the events A-J, the user may select whether that particular alert is ON or OFF. Alert A gives an alert to the customer whenever a balance transfer has been posted to their account. The particular information that is included in alert A, or in any of the alerts, may vary as desired. For example, with Alert A, the alert may simply indicate that a balance transfer has been performed and not the particulars, i.e. the amount of the balance transfer.

Various other alerts may be provided by the MSG application 400 and included in the interface 1602 of FIG. 16. Alert B advises a customer when an international charge has been posted to their account. Alert C advises a customer when a payment has been posted to their account. Alert D allows a customer to indicate the threshold monetary amount that will trigger an alert for a single transaction. Alert E advises the client when their available credit is less than a particular monetary amount, which is also selectable by the customer. Alert F advises the customer when their available credit is less than a particular amount selected by the customer. In accordance with one embodiment, the available credit may be set out as a percentage of the credit limit, or alternatively, the available credit limit may be set out as a dollar amount. Alert G advises the client when their balance reaches a particular monetary amount, which is selected by the user. In this embodiment, the balance amount is included in the alert message. Alert H advises the client that their payment is due in a particular number of days. For example, in the example of FIG. 16, the customer is alerted 3 days in advance of their payment being due. Alert I advises the customer when their rewards balance exceeds a particular amount, selected by the customer. Alert J advises the client that no payment was received for a particular account. That is, the Alert J may be triggered upon a certain due date being passed by.

It is appreciated that various other alerts may be provided. The nature and the information associated with such alerts may vary as desired.

Figure 17:
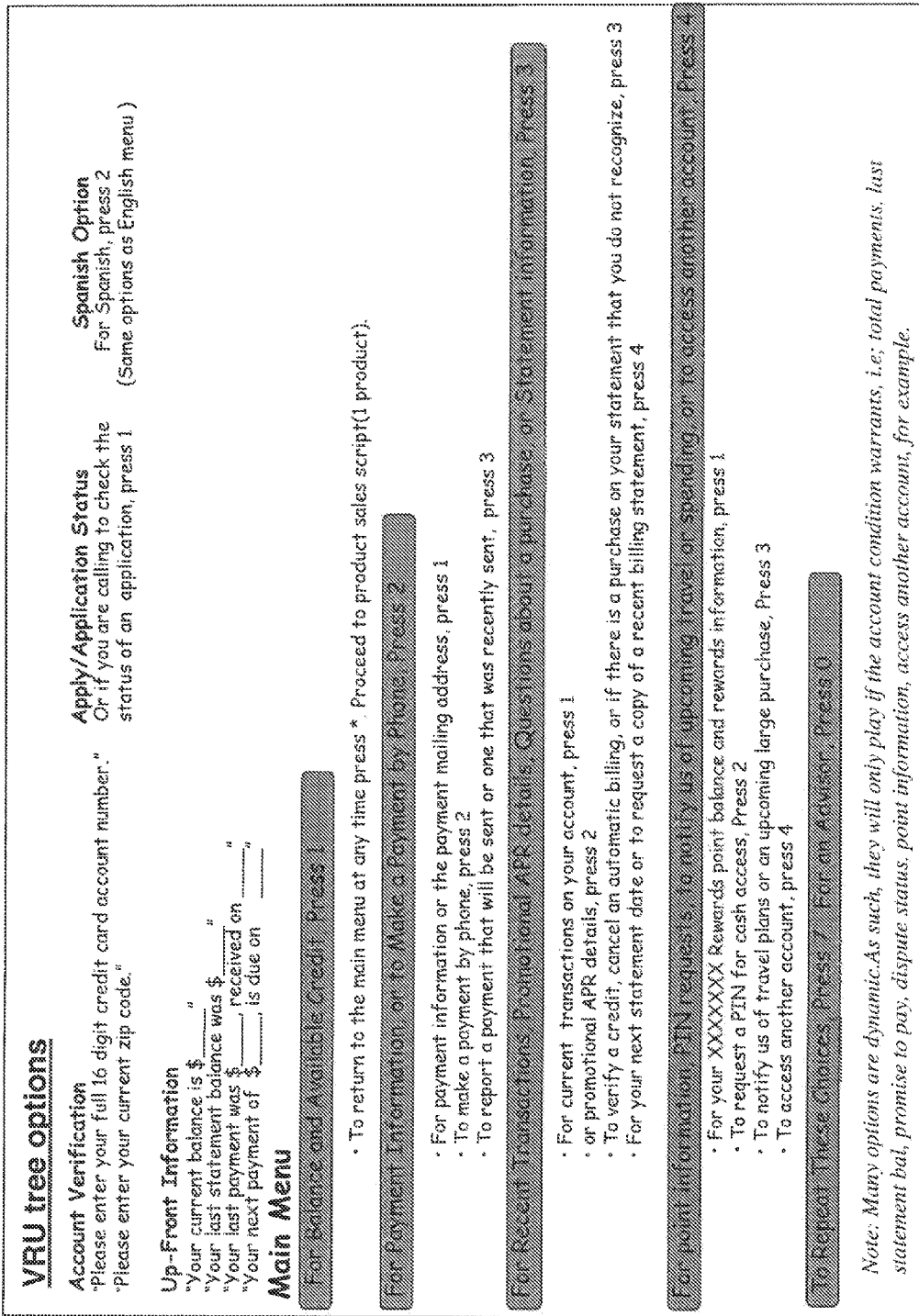
FIG. 17 is a diagram showing Voice Recognition Unit (VRU) tree options, in accordance with one embodiment of the invention.

As described above, voice recognition technology may be utilized by the MSG application 400. Relatedly, FIG. 17 is a diagram showing Voice Recognition Unit (VRU) tree options, in accordance with one embodiment of the invention. As shown in FIG. 17, the MSG application 400 first inputs information for account verification. For example, the MSG application 400 may request the customer to enter their full 16 digit credit card account number, as well as their current zip code. Alternatively, the MSG application 400 may provide an abbreviated account verification such as requesting the customer to input the last 4 digits of their credit card account number as well as their zip code. This information may be used in conjunction with the phone number from which the customer is calling, so as to perform verification of the customer. As shown in FIG. 17, other options may be available to the calling customer, such as checking the status of an application and/or a language option, for example.

After account verification is performed by the MSG application 400, the MSG application 400, in accordance with one embodiment, provides upfront information. Such upfront information may include current balance, the last statement balance, the last payment and the date that the last payment was received, as well as the amount of the next payment and the date upon which the next payment is due. After the MSG application 400 provides the upfront information as described above, a main menu of options may be presented to the customer.

The main menu options may provide a variety of options to the customer. For example, for balance and available credit, the user may be prompted to press 1. For payment information, or to make a payment by phone, the user may be prompted to press 2. For recent transactions, promotional APR details, questions about a purchase, or statement information, the user may be prompted to press 3. For point information, PIN requests, to notify the bank of upcoming traveler spending, or to access another account, the user maybe prompted to press 4. On a general note, the user may be provided the option to press 7 to repeat the various choices that are available to the user and/or press 0 for an advisor.

It is of course appreciated that various other options and capabilities may be provided to the customer.

FIG. 18 is a diagram showing further VRU items in accordance with one embodiment of the invention. Specifically, FIG. 18 shows further menu options that may be provided to the customer. Option 2 allows the customer to change their payment mailing address. Option 3 allows a customer to verify a credit. Option 3 may also be provided to advise the customer of the next statement date as well as to request a copy of a recent billing statement. Option 4 may be provided such that a user may request a PIN for card access. Such Option 4 might require the customer to enter the last 4 digits of their SS# (social security number) and/or enter a current PIN before their new PIN is issued either verbally in the phone conversation or via mail, for example.

As described herein, the customer machine 100, i.e., the customer device, may act as a payment mechanism. The MSG system 10 (including the MSG application 400 and/or the MSG bank processing portion 314) may use any particulars, i.e., attributes, associated with such customer machine 100 in conjunction with authenticating a requested transaction, providing desired information, or performing other processing. Included in the particulars associated with a customer machine, are attributes that might be characterized as "situational particulars"—which are attributes that are dependent on the particular situation that the customer machine 100 is in. In particular, the particular geographical location of a customer machine 100 constitutes a "situational particular."

In accordance with embodiments of the invention, a situational particular of one customer device 100 may be compared with the situational particular of another payment device—to authenticate a requested transaction (and relatedly identify fraud), provide desired information, or perform other processing. Further, the MSG system 10 may compare a situational particular from a customer device with other situational particulars relating to the customer, and in particular a situational particular from another payment device.

That is, for example, the MSG application 400 (in a first customer device) may input data from the bank processing system 300 regarding a requested transaction that is purportedly effected by the user, such transaction being performed by a distinct payment device different from the first customer device. The mobile banking platform, i.e., the MSG application 400, then compares the situational particulars of the first customer device vis-à-vis the situational particulars of the distinct payment device. In particular, the situational particulars of the mobile customer device may relate to location of the mobile customer device, and similarly, the situational particulars of the distinct payment device may relate to location of the distinct payment device, as determined by a point of sale (POS) for example. Using a suitable set of rules, if the MSG application 400 identifies a mismatch that cannot be legitimately explained, then the MSG application 400 sends an alert, as desired. In lieu of the MSG application 400, the MSG bank processing portion 314 may perform such mismatch processing, or some other processing component may perform such mismatch processing. Illustratively, the customer device might be a smart phone, and the distinct payment device might be a credit card. If the POS of a transaction using the credit card doesn't match with the GPS location of the smart phone, then an alert is triggered. Accordingly, the MSG system 10 may use a wide variety of information in various processing, as described herein.

As described above, the situational particulars of a first customer device is compared vis-à-vis the situational particulars of a payment device. However, it is appreciated that various dynamics need be taken into account in such processing, in some embodiments. For example, it may well be the case that a cell phone is left in a customer's car while the customer takes her payment device, i.e., her credit card, into a store. However, in accordance with embodiments of the invention, the MSG application 400 may take various patterns into account, so as to limit the number of alerts that are triggered. For example, if the first customer device and payment device (via POS (point of sale)) are determined by the MSG application 400 to be in the same proximate area (e.g. within a half mile of each other) then no alert will be triggered. On the other hand, if the first customer device and payment device are determined to be 5 miles apart, and away from the home (or other commonly occupied location such as the customer's office) of a single user, then the MSG application 400 may generate an alert, i.e., based on a suitable rule set. Various other criteria and patterns may be taken into account, as desired.

Hereinafter, further aspects regarding implementation of the systems and methods of the invention will be described.

As described herein, embodiments of the system of the invention and various processes of embodiments of the method of the invention are described. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, including any of the tasks described herein. Such a set of instructions for performing a particular task may be characterized as a program, software program, or simply software.

As noted herein, the processing machine executes the instructions that are stored in the memory or memories to process data. This processing of data may be in response to commands by a user or users of the processing machine, in response to previous processing, in response to a request by another processing machine and/or any other input, for example.

As noted herein, the processing machine used to implement the invention may be a general purpose computer. However, the processing machine described herein may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described herein, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described herein is performed by various components and various memories. However, it is appreciated that the processing performed by two or more distinct components as described herein may, in accordance with a further embodiment of the invention, be performed by a single component. Further, the processing performed by one distinct component as described herein may be performed by two or more distinct components. In a similar manner, the memory storage performed by two or more distinct memory portions as described herein may, in accordance with a further embodiment of the invention, be performed by a single memory portion. Further, the memory storage performed by one distinct memory portion as described herein may be performed by two or more memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example. As used herein, the term "talking" in reference to devices means that the devices are communicating with each other.

As described herein, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described herein, the invention may illustratively be embodied in the form of a processing machine, including a computer or computer system, for example, that includes at least one memory. It is to be appreciated that the set of instructions, i.e., the software for example, that enables the computer operating system to perform the operations described herein may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed herein, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. An application that provides a mobile banking platform to a user, the application disposed in a mobile customer machine that is associated with the user, the application tangibly disposed in the form of code on a computer readable medium, the application comprising:
    a processing portion, comprising at least one computer processor, that interfaces with the user and interfaces with a bank processing system, the processing portion providing financial related functionality relating to a financial account of the user, the processing portion:
        inputting data related to the financial account from at least one of the user and from the bank processing system;
        inputting a command related to the data, wherein the command acts on the inputted data;
        performing processing on the data in response to the command, wherein the processing portion is configured to provide a plurality of functions associated with a profile of the financial account of the user comprising:
            an alert function providing management of a plurality of real-time alerts associated with the financial account, wherein at least one real-time alert is associated with a fraud alert;
            a control function providing notification to the bank processing system of one or more future travels and purchases;
            a service function providing status and payment information associated with the financial account; and
            an advisor function providing communication with an advisor or a representative associated with the bank processing system by bypassing one or more security prompts;
        outputting a result based on the processing performed, the result output to at least one of the user and the bank processing system;
    wherein the processing portion further comprises the ability for the user to change the plurality of functions, the ability for the user to change the plurality of functions for a second user, and the ability for the user to change the plurality of functions for different profiles of the second user, where the different profiles of the second user are respectively associated with different financial accounts of the second user.

2. The application of claim 1, wherein the mobile customer machine is a cellular phone.

3. The application of claim 2 wherein the processing portion interfaces with the user using interface technology of the cellular phone, the user being a human user.

4. The application of claim 1, wherein the mobile customer machine is a personal digital assistant (PDA).

5. The application of claim 1, wherein the command is input from the user.

6. The application of claim 1, wherein the command is input from the bank processing system.

7. The application of claim 1, wherein one of the plurality of real-time alerts comprises an alert to the user regarding activity associated with the account.

8. The application of claim 7, wherein the activity associated with the account is constituted by activity perceived as potentially fraudulent activity.

9. The application of claim 1, wherein the processing performed on the data relates to the user providing data to the bank processing system that relates to an anticipated future purchase.

10. The application of claim 1, wherein the processing performed on the data relates to the user providing data to the bank processing system that relates to an anticipated future travel event.

11. The application of claim 10, wherein the processing performed on the data includes identifying the future travel event, identifying purchaseable products associated with the future travel event, and alerting the user to the purchaseable products, such that the user may purchase the purchaseable products.

12. The application of claim 1, wherein the processing performed on the data relates to the user providing data to the bank processing system that relates to a disputed transaction.

13. The application of claim 1, wherein the application interfaces with the bank processing system over a cellular network.

14. The application of claim 1, wherein the application includes disablement functionality.

15. A method that provides a mobile banking platform to a user, the method performed by computer code on a computer readable medium disposed in a mobile customer machine that is associated with the user, the method comprising the steps of:
    interfacing with both the user and a bank processing system;
    providing, based on such interfacing, financial related functionality associated with a profile of a financial account of the user;
    the interfacing including:
        inputting data related to the financial account from at least one of the user and from the bank processing system;
        inputting a command related to the data, wherein the command acts on the inputted data;
        performing processing, via at least one computer processor, on the data in response to the command, wherein the processing portion is configured to provide a plurality of functions comprising:
            an alert function providing management of a plurality of real-time alerts associated with the financial account, wherein at least one real-time alert is associated with a fraud alert;
            a control function providing notification to the bank processing system of one or more future travels and purchases;
            a service function providing status and payment information associated with the financial account; and
            an advisor function providing communication with an advisor or a representative associated with the bank processing system by bypassing one or more security prompts; and
        outputting a result based on the processing performed, the result output to at least one of the user and the bank processing system, the processing based on at least one rule associated with at least one parameter that controls when the rule is triggered, and at least one of the parameters being established based on interfacing with the user;
    wherein the interfacing further comprises the ability for the user to change the plurality of functions, the ability for the user to change the plurality of functions for a second user, and the ability for the user to change the plurality of functions for different profiles of the second user, where the different profiles of the second user are respectively associated with different financial accounts of the second user.

16. The method of claim 15, further including the mobile banking platform inputting mobile device information that identifies the mobile customer machine, the mobile banking platform outputting the mobile device information to the bank processing system, such that the mobile customer machine is registered with the bank processing system, and the mobile banking platform inputting information from the bank processing system that identifies other mobile customer machines, which are associated with the customer.

17. The method of claim 16, wherein the interfacing further includes presenting the customer with options relating to alerts generated by the at least one rule.

18. The method of claim 17, wherein the options relate to variables that control triggering of the alert, the variables being changeable by the user.

19. The method of claim 17, wherein the options relate to controlling types of alerts, and what types of alerts are sent to which mobile customer machines.

20. The method of claim 15, wherein the rule relates to a transaction performed by the user, the rule alerting the user to at least one of: possible fraud associated with the transaction, a credit issue associated with the transaction, or that the transaction is an online purchase.

21. The method of claim 15, wherein the financial related functionality includes the mobile banking platform inputting data from the bank processing system regarding a requested transaction that is purportedly effected by the user, such transaction being performed by a distinct payment device different from the mobile customer machine, the mobile banking platform comparing situational particulars of the mobile customer machine vis-à-vis situational particulars of the distinct payment device.

22. The method of claim 21, wherein the situational particulars of the mobile customer machine relate to location of the mobile customer machine and the situational particulars of the distinct payment device relate to location of the distinct payment device as determined by a point of sale.

23. The method of claim 22, wherein the mobile customer machine is a smart phone, and the distinct payment device is a credit card.

\* \* \* \* \*